United States Patent [19]
Linford et al.

[11] Patent Number: 6,081,611
[45] Date of Patent: Jun. 27, 2000

[54] AESTHETIC IMAGING SYSTEM

[75] Inventors: Ray A. Linford, Kirkland; Perin Blanchard, Woodinville, both of Wash.

[73] Assignee: Mirror Software Corporation, Kirkland, Wash.

[21] Appl. No.: 09/002,041

[22] Filed: Dec. 31, 1997

Related U.S. Application Data

[60] Division of application No. 08/617,439, Mar. 18, 1996, abandoned, which is a continuation-in-part of application No. 08/406,201, Mar. 17, 1995, Pat. No. 5,687,259.

[51] Int. Cl.[7] .................................................. G06K 9/00
[52] U.S. Cl. .......................... 382/128; 382/294; 434/262
[58] Field of Search .................................. 382/128, 294, 382/188, 189, 295; 434/262

[56] References Cited

U.S. PATENT DOCUMENTS

| | | | |
|---|---|---|---|
| 3,898,617 | 8/1975 | Kashioka et al. | 382/151 |
| 4,434,467 | 2/1984 | Scott | 364/400 |
| 4,635,293 | 1/1987 | Watanabe | 382/130 |
| 4,641,352 | 2/1987 | Fenster et al. | 382/130 |
| 4,672,676 | 6/1987 | Linger | 382/141 |
| 4,918,611 | 4/1990 | Shyu et al. | 382/100 |
| 4,965,841 | 10/1990 | Kaneko et al. | 382/100 |
| 4,975,960 | 12/1990 | Petajan | 704/251 |
| 5,060,171 | 10/1991 | Steir et al. | 345/435 |
| 5,133,020 | 7/1992 | Giger et al. | 382/128 |
| 5,280,570 | 1/1994 | Jordan | 345/435 |
| 5,299,270 | 3/1994 | Tokura | 382/216 |
| 5,337,231 | 8/1994 | Nowak et al. | 600/425 |
| 5,375,195 | 12/1994 | Johnston | 345/435 |
| 5,403,191 | 4/1995 | Tuason | 434/262 |
| 5,404,426 | 4/1995 | Usami et al. | 345/420 |
| 5,515,447 | 5/1996 | Zheng et al. | 382/100 |
| 5,532,839 | 7/1996 | Beikirch et al. | 358/401 |
| 5,537,662 | 7/1996 | Sato et al. | 345/435 |
| 5,680,528 | 10/1997 | Korszun | 345/435 |

OTHER PUBLICATIONS

*Snap™ Manual*, Envision International, Inc., 1992 pp. i–v, 1–47, *Update to Tips User's Guide*, Tips™ Imaging Software for the Targa™.
Videographics Adapter, Model 16,24 and 32, Truevision, Inc., Indianapolis, Indiana, 1987, pp. 2–1 through 2–42 and 3–1 through 3–136.

*Primary Examiner*—Joseph Mancuso
*Assistant Examiner*—Jayanti K. Patel
*Attorney, Agent, or Firm*—Christensen, O'Connor, Johnson & Kindness PLLC

[57] ABSTRACT

Disclosed is an aesthetic imaging system (20) for use in editing digital images. The aesthetic imaging system includes an imaging program (21) that runs on a personal computer (28) having an image capture board (30), a monitor (32), a video source (34) for providing digital images to be edited by the aesthetic imaging system, and a pen and tablet 38 for use in editing the images. The imaging program includes a unique combination draw tool that includes a freehand draw mode, a curve mode and an undo mode that are available without cycling through menus. The combination draw tool may be used with any of the draw tools. Another feature of the imaging program is autoblend, a rectangular user interface that is invoked by each of the shape tools. The autoblend interface simplifies editing when using shape tools by consolidating the move, paste and blend, and paste without blending commands into a single, convenient interface.

4 Claims, 33 Drawing Sheets

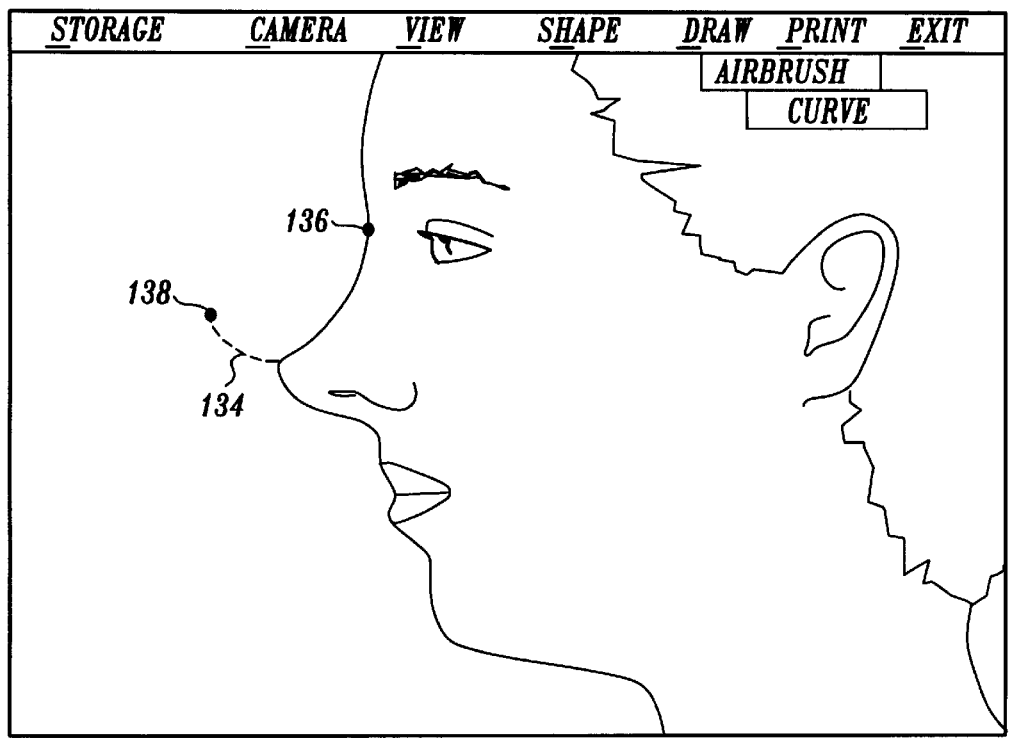
( PRIOR ART ) Fig. 7A.
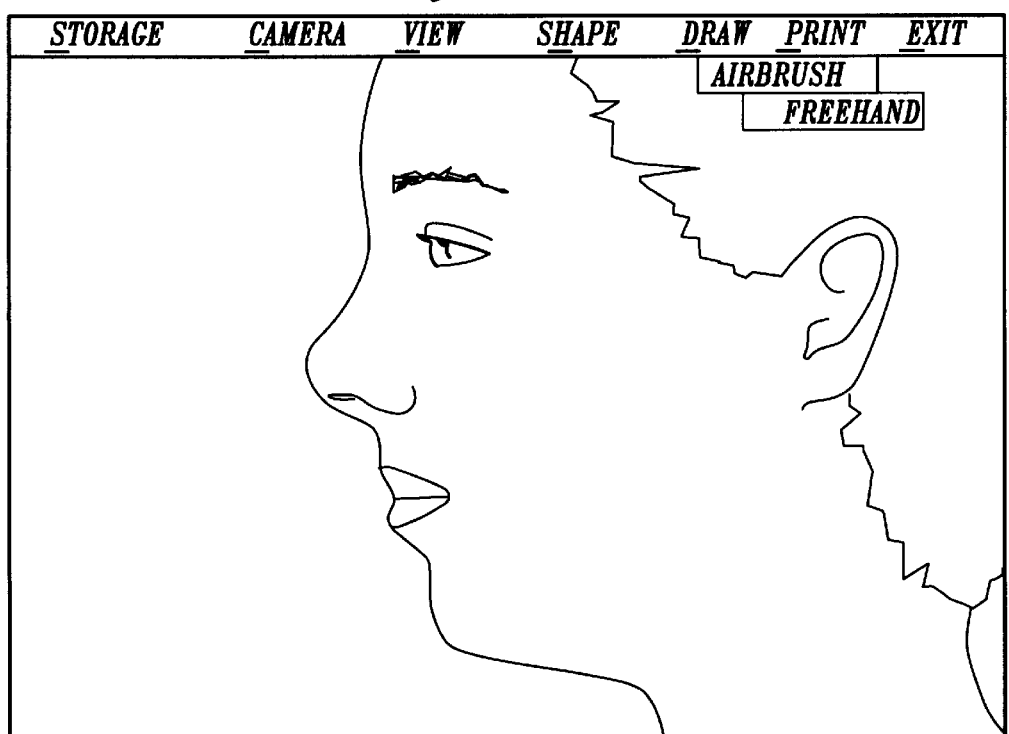
( PRIOR ART ) Fig. 7B.

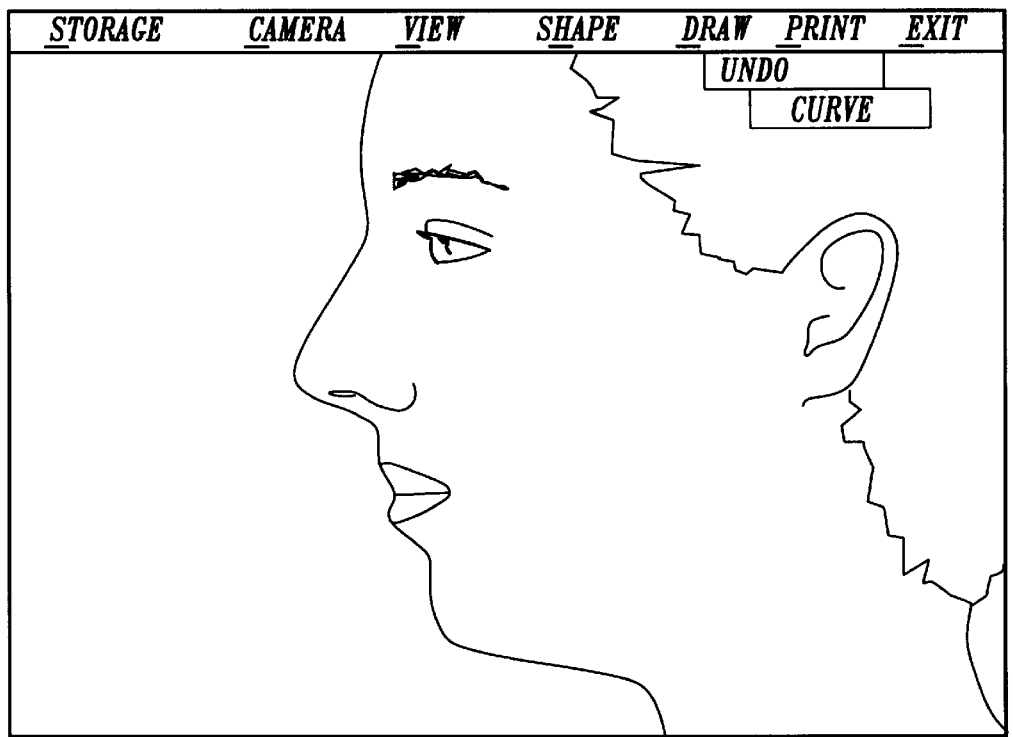
( PRIOR ART ) *Fig. 7C.*
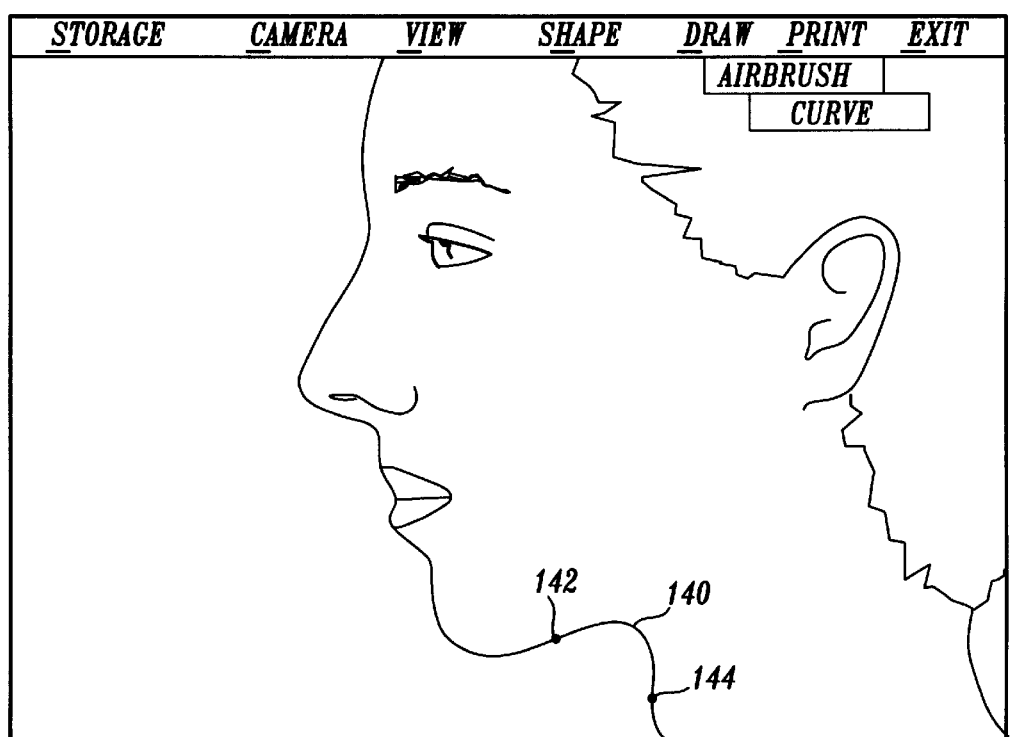
( PRIOR ART ) *Fig. 7D.*

AESTHETIC IMAGING SYSTEM

RELATIONSHIPS TO OTHER APPLICATIONS

This application is a divisional of U.S. patent application Ser. No. 08/617,439, filed Mar. 18, 1996 now abandoned which is a continuation-in-part of U.S. patent application Ser. No. 08/406,201, filed Mar. 17, 1995 (now U.S. Pat. No. 5,687,259), the benefit of the filing dates of which is claimed under 35 U.S.C. §120.

FIELD OF THE INVENTION

This invention generally relates to computer imaging programs and, more specifically, to a method and apparatus for manipulating digital photographs.

BACKGROUND OF THE INVENTION

The digital age continues to present additional opportunities for visual communication using computers. As an example, digital photographs are routinely being manipulated to produce a desired effect or result in the magazine and film-making industries. In the medical field, computer-based imaging has and continues to gain acceptance in a clinical setting as a viable communications tool between plastic or "cosmetic" surgeons and potential patients.

People are with increasing frequency consulting physicians about cosmetic surgery. While in many cases the patients considering cosmetic surgery have an impressive understanding of the procedures available and medical terms used to describe these procedures, it is apparent that the slightest miscommunication may result in dire consequences. This has promoted the use of computer imaging to facilitate communication between the physician and prospective patient. Specifically, high-end aesthetic imaging systems allow a physician to take pre-operative digital images of the patient, e.g., including profile and frontal views. The images are stored in memory in the computer where they can then be edited. Using feedback from the patient, the edited images are useful in fully understanding the procedures desired. The visual support provided by a computer-based imaging system is extremely valuable on both sides. A cosmetic surgeon can more readily understand what patients hope to achieve by a cosmetic surgical procedure; and patients can view a detailed visual representation of predicted results, including both the benefits and limitations of the procedure.

Existing aesthetic imaging systems typically use a number of tools to allow a physician to manipulate a pre-operative image of a patient to illustrate an intended post-operative result. Preferably, the tools allow the physician to manipulate the preoperative image during a consultation with a patient. By manipulating the image with the patient in attendance, the patient receives immediate feedback from the displayed results. For a successful preoperative consultation, the use of the editing tools should be as unobtrusive as possible. During the consultation, a physician would like the patient to focus on the end results of the surgery, rather than the technologic wizardry used to demonstrate those results on the video monitor. Unfortunately, the editing tools used in existing aesthetic imaging systems typically hinder rather than help the physician in demonstrating the results that may be achieved through cosmetic surgery.

Among others, a disadvantage of existing aesthetic imaging programs is that a physician or facilitator in a pre-operative consultation typically must go back and forth through many windows-based menus in order to edit an image. Cycling between the various menus to invoke the tools necessary for a consultation is disadvantageous in that it is time consuming. For example, some physicians schedule a follow-up visits for patients to allow the physician time to edit the images. More important, however, is that the process is distracting to the patient and tends to make the pre-operative consultation all the more mystifying. As a result of the disadvantages associated with prior art systems, some patients lose interest or become frustrated with the interview, both of which may reflect back on the physician.

A further disadvantage of existing aesthetic imaging systems is that it is impossible for a physician or facilitator to display different combinations of the edits that they have performed. In existing aesthetic imaging programs, as a physician edits a patient's image, the physician's edits are added to the preexisting edits of the image. Most programs are only capable of showing two version of the patient's image; the unedited, original version, and the final edited version incorporating all of the physician's changes. It is therefore difficult for the physician to show various combinations of the edits that had been performed. For example, a physician may edit an image to remove wrinkles around a patient's eyes and to narrow the patient's nose. Existing aesthetic imaging programs only allowed the physician to simultaneously show all of these changes. If, for example, the patient wished to view the changes to the eyes without the changes to the nose, it was difficult for the physician to easily separate out the sequence of edits that had been performed to adjust the patient's nose. An improved aesthetic imaging system in which a physician can more easily edit pre-operative images in response to a patient's suggestions and inquiries would be extremely advantageous.

A still further disadvantage of existing aesthetic imaging systems is that the systems allow a physician to perform nearly flawless editing of a patient's image. Unfortunately, the edits performed by a physician on an aesthetic imaging system are often unobtainable results that cannot be achieved when actual surgery is performed. Unless the physician is especially skilled at using the aesthetic imaging system, it is difficult to show the patient achievable results, which typically fall within a range somewhere between the original patient image, and the optimum results as displayed by the edited image on the screen. It therefore would be advantageous to develop an aesthetic imaging system that allowed a physician to display more realistic results that are achievable through surgery.

SUMMARY OF THE INVENTION

The invention is an aesthetic imaging system for use in editing digital images. The aesthetic imaging system includes a unique user interface that allows edits to be performed more efficiently and with less confusion to the patient.

In one aspect of the invention, a method of editing a digital image comprised of a plurality of color pixels in an aesthetic imaging system is disclosed. The aesthetic imaging system including a processor, a memory, a monitor, and a pen and cooperating tablet for controlling a cursor displayed on the monitor. The pen has a depressable tip and a side button, each of which include an on status and an off status, wherein the position of the pen tip relative to the tablet determines the position of the cursor on the monitor. The method comprises: (a) evaluating the following variables: (i) the status of the tip of the pen; (ii) the status of the side button on the pen; and (iii) movement of the pen tip relative to the tablet; (b) actuating a freehand drawing mode if a first set of variables are present, wherein movement of the pen relative to the tablet edits pixels that are located at positions corresponding to the position of the cursor; and (c) actuating a curve drawing mode if a second set of variables are present, wherein a line segment is displayed between two endpoints and movement of the pen relative to the tablet stretches the line segment, forming a curve and editing pixels that are located at positions corresponding to the position of the curve.

In another aspect of the invention, method further includes: (a) actuating a freehand undo mode if a third set of variables are present, wherein movement of the pen relative to the tablet restores pixels that are located at positions corresponding to the position of the cursor to their pre-edited color; and (b) actuating a curve undo mode if a fourth set of variables are present, wherein a line segment is displayed between two endpoints and movement of the pen relative to the tablet stretches the line segment, forming a curve and restoring pixels that are located at positions corresponding to the position of the curve to their pre-edited color.

In other aspects of the invention, the freehand draw mode is actuated if the tip of the pen is depressed and pressure is maintained while the tip is moved a predetermined distance. In another aspect, the curve draw mode is actuated if the tip of the pen is depressed and released within a predetermined distance.

In a further aspect of the invention, the curve draw mode is actuated by: (a) establishing a first endpoint at the position of the pen when the second set of variables are present; and (b) monitoring the status of the tip of the pen and establishing a second endpoint at the position of the pen if the tip is toggled from an off state to an on state.

In another aspect of the invention, an improved prioritize feature is described for viewing an image. A user may identify several areas in a modified patient image containing edits that alter the image from the original image. As each area is identified by the user, an identifying tag is assigned to each of the areas. When desiring to show various combinations of the edits that have been performed on the image, the user may select the areas to display using the identifying tags. A user may therefore quickly cycle through various permutations of the procedures that have been edited for patient display.

In still another aspect of the invention, an improved user interface is provided to minimize the distraction of a patient as the patient is watching the image being edited. Preferably, a menu bar on the top of the display is removed during most editing, so that only the image of the patient is displayed. When the menu bar must be displayed, the bar itself is transparent to allow the patient to see the image-through the menu bar. Only the commands and the outline of the menu bar are presented in a contrasting color, minimizing the overall visual impression created by the menu bar.

In yet another aspect of the invention, a warp tool is described that allows a user to quickly and easily manipulate various features in an image. To use the warp tool, a user first encircles a portion of the image to be edited. Once the area has been selected, the user may tip the pen to designate a stretch point within the selected area. As the user floats the pen over the tablet, the image is then stretched as if pulled from the stretch point. Areas of the image in the direction of stretch are compressed, and areas away from the direction of stretch are expanded. Areas surrounding the warping area are automatically adjusted to ensure that there is no discontinuities with the warping area. The manipulation of the image is performed in real-time, allowing a patient to see the warping as it is being performed by a user.

An advantage of the tools and features described herein are that they improve the overall experience of a patient during a preoperative visit with a physician. The powerful tools in the aesthetic imaging system allow the physician to easily manipulate the patient's image in response to feedback provided by the patient. The aesthetic imaging system interface also allows the patient to focus on the image being manipulated, rather than on the aspects of the aesthetic imaging system that allow the manipulation. The end result is an improved preoperative visit that provides a more realistic impression of the results that a physician may achieve through surgery.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A–7E are pictorial representations of editing an image using a prior art imaging program;

DETAILED DESCRIPTION OF THE PREFERRED EMBODIMENT

Figure 1:
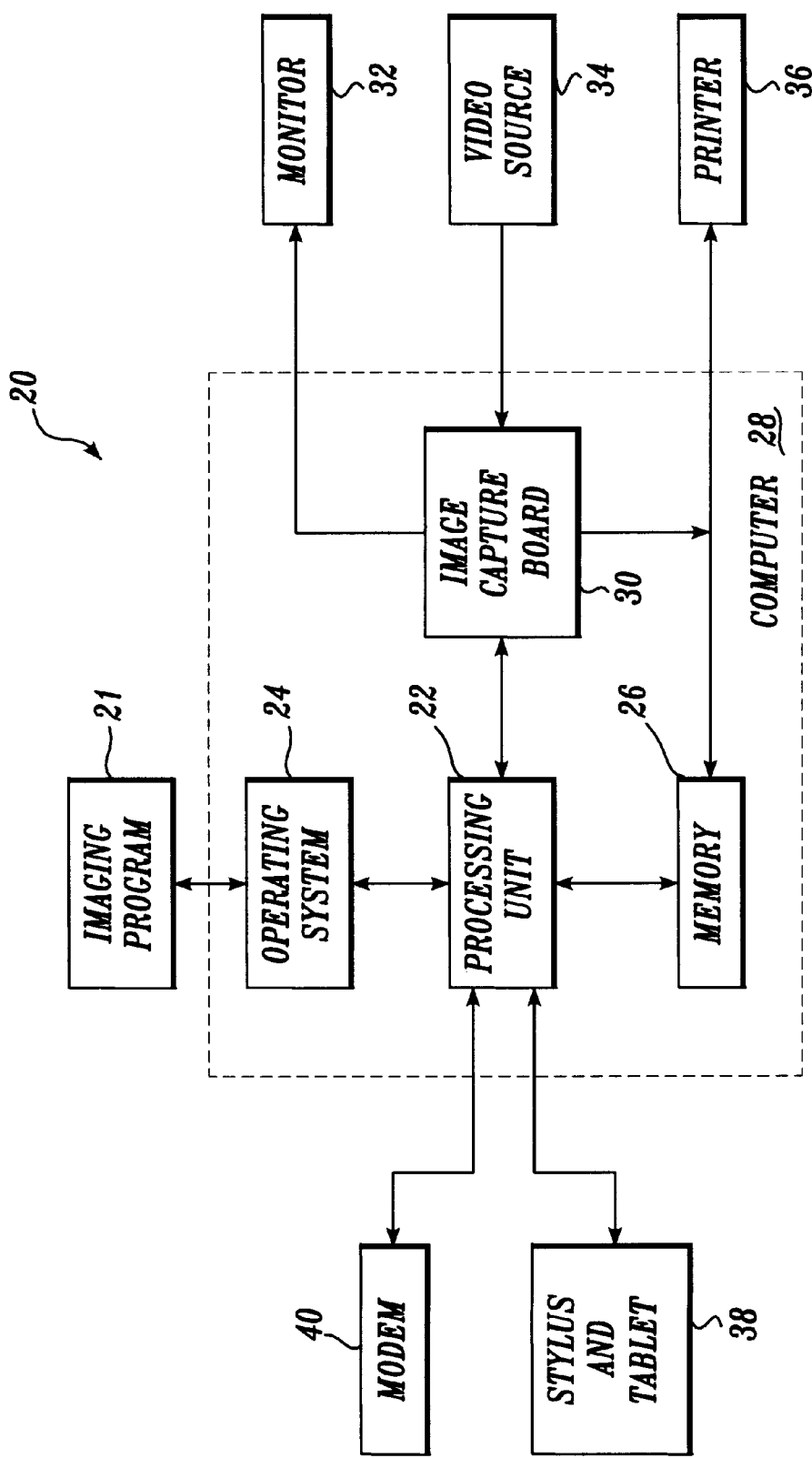
FIG. 1 is a block diagram of an aesthetic imaging system in accordance with the invention.

An aesthetic imaging system 20 in accordance with the invention is illustrated in FIG. 1. The aesthetic imaging system 20 includes an imaging program 21 that runs on a processing unit 22 controlled by an operating system 24. A memory 26 is connected to the processing unit and generally comprises, for example, random access memory (RAM), read only memory (ROM), and magnetic storage media such as a hard drive, floppy disk, or magnetic tape. The processing unit and memory are typically housed within a personal computer 28 which may be, for example, a Macintosh™, International Business Machines (IBM™) or IBM-compatible personal computer. When used with IBM and IBM-compatible personal computers, the operating system 24 may be DOS based or may incorporate a windowing environment such as Microsoft Windows™ or OS/2™.

The aesthetic imaging system also includes an image capture board 30 that is coupled to the processing unit 22, a monitor 32, video source 34, and printer 36. The video source, monitor, and printer are coupled to the processing unit 22 through the image capture board 30. The video source may include one or more video cameras, a VCR, a scanner, or sinilar source for providing digital images to be edited by the aesthetic imaging system. The aesthetic imaging system further includes a pointing device, which is preferably a stylus (pen) and tablet 38, that is connected to the processing unit 22. In addition, the aesthetic imaging system may include a modem 40 to provide on-line capabilities to users of the system, such as technical support and teleconferencing.

Figure 2:
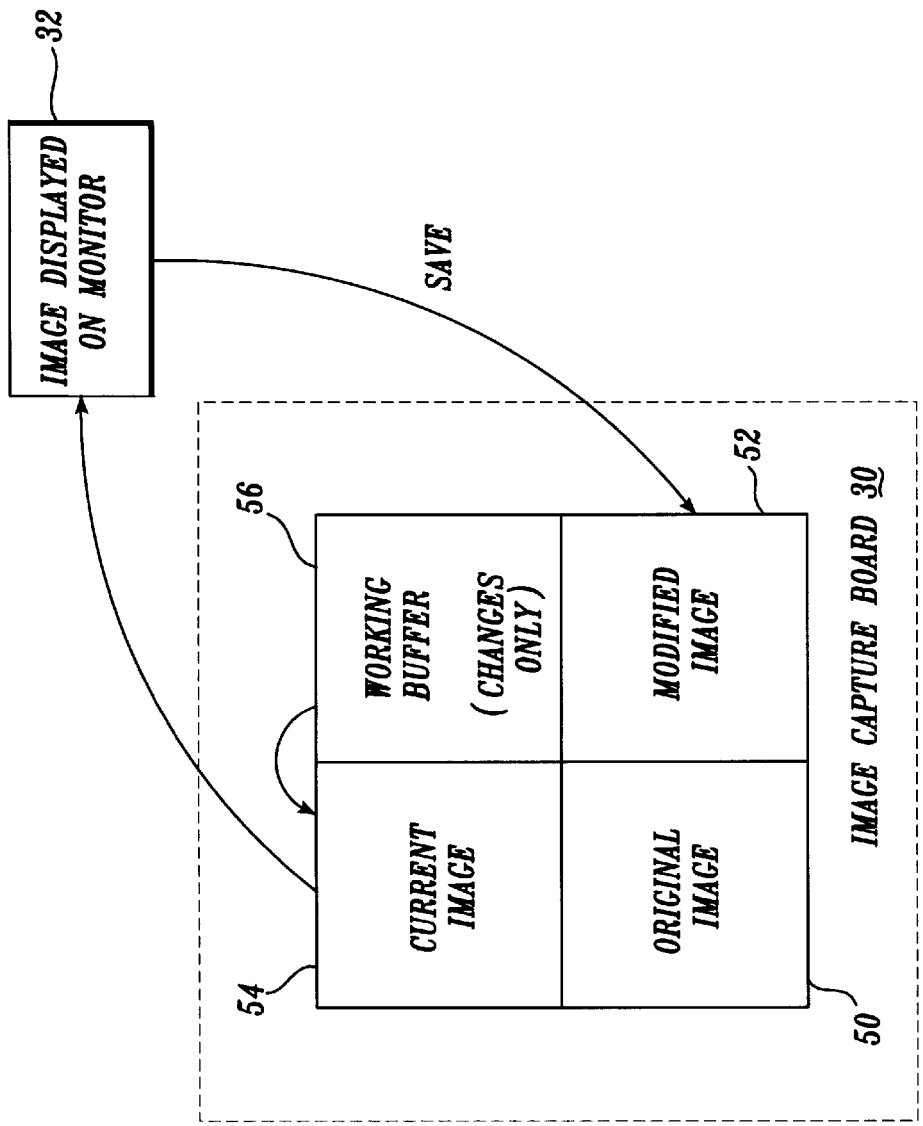
FIG. 2 is a block diagram illustrating various buffers used by the aesthetic imaging system to store and manipulate data.

The image capture board 30 has a plurality of buffers in high-speed memory, e.g., RAM, that are used by the imaging program 21 to provide very fast response times to image edits. With reference to FIG. 2, four buffers are illustrated for use in explaining the operation of the aesthetic imaging system. These include an original image buffer 50, a modified image buffer 52, a current image buffer 54, and a working buffer 56. Suitable image capture boards for use in the aesthetic imaging system include the Targa +64 and Targa 2000 boards, distributed by Truevision, Inc. of Indianapolis, Ind. The buffers are discussed in regard to a single pose only, such as a profile or front view of a person.

The original image buffer 50 contains an unedited digital image, for example, a side profile picture of a potential patient. The modified image buffer 52 contains any edits made to a copy of the original image. The modified image buffer is updated during a save and after each session. The current image buffer 54 contains information identical to the modified image buffer upon beginning a session. Thereafter, edits made to the current image are saved in the working buffer 56 as an overlay to the current image. During a save, the contents of the current image buffer 54 are copied to the modified image buffer 52, and the working buffer 56 is cleared.

Prior to discussing the aesthetic imaging system in further detail, a compendium of terms used in the application may be helpful:

Image
   A digital photograph or picture of a patient.

Stylus
   The "pen" that may be used to select menus, modify images, and carry out other commands in the program. The stylus controls the cursor, just as a mouse pointing device does on a personal computer.

Tablet, or Pad
   The electronic notepad used in conjunction with a stylus. The pen must be held relatively close to the pad in order for the pen to communicate with the tablet. Unlike a mouse, the tablet follows an X / Y grid that matches the monitor, i.e., if the pen is positioned at the top left comer of the tablet, the cursor is displayed at the top left comer on the monitor.

Floating
   Moving the pen to move the cursor, without actually touching the tablet.

Selecting
   Selecting (also referred to as "tipping" or "pressing") the tip of the pen briefly onto the tablet. This selects a command or affects the drawing tool, depending on the current procedure being implemented.

Cancel
   Using the side button on the pen to execute a command.

Moving
   Pressing the tip of the pen on the tablet, releasing it, then moving it across the tablet.

Pressing or Tipping & Dragging
   Pressing the tip of the pen, then dragging it across the tablet while maintaining pressure. When using drawing and shaping tools, this turns the cursor into a drawing tool, enabling the user to draw freehand objects or "brush" the image in any manner.

Figure 3:
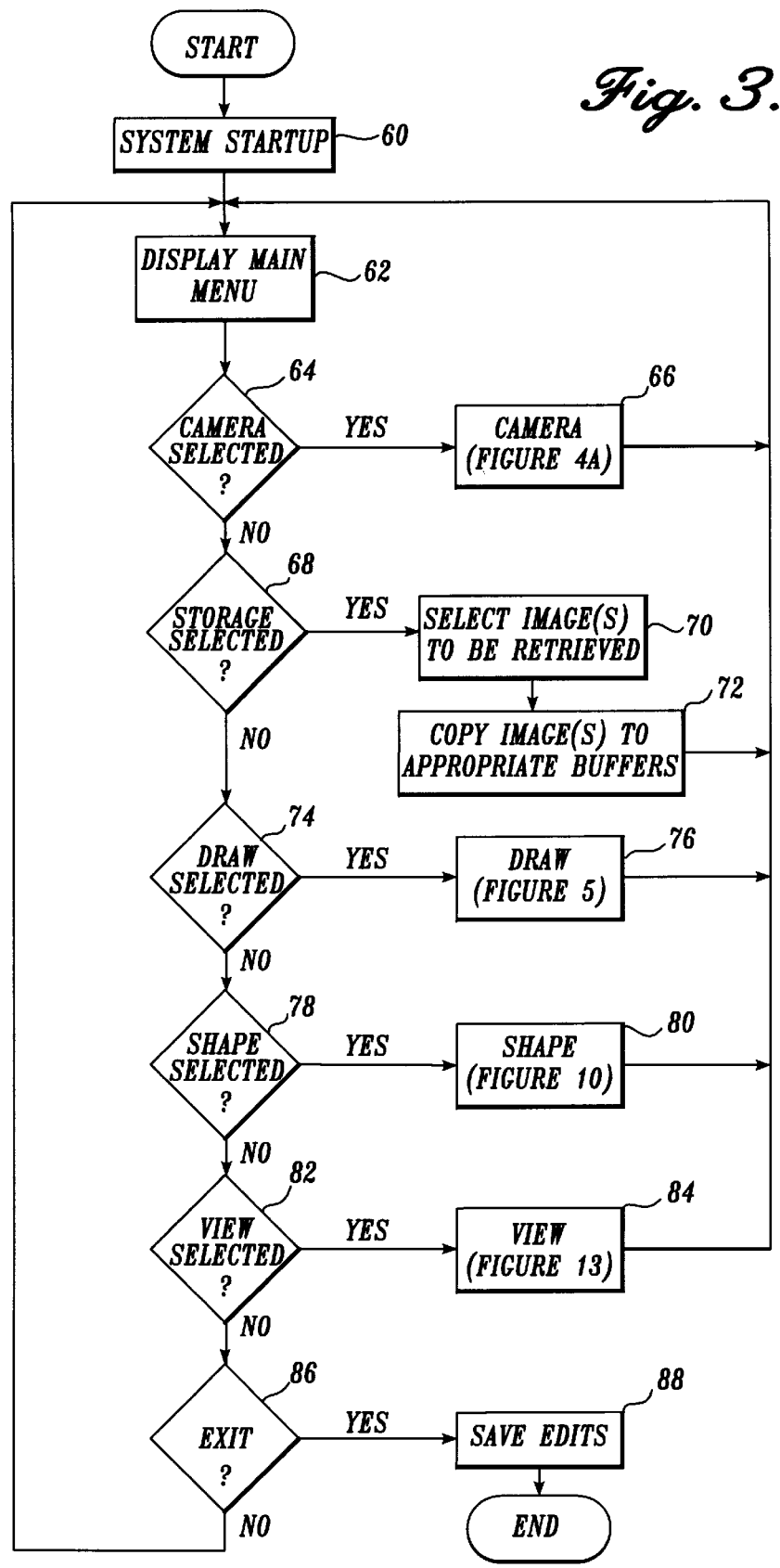
FIG. 3 is a flow chart illustrating an exemplary routine by which digital images may be viewed and edited using the aesthetic imaging system.

FIG. 3 illustrates an exemplary routine for implementing the imaging program 21 in accordance with the invention. At block 60, a system startup is performed wherein the computer looks for peripheral devices that are connected to the aesthetic imaging system, the memory is tested, and any other startup procedures needed to get the system up and running are implemented. At block 62, the imaging program displays a main menu, which provides access to the various features of the imaging program. Specifically, the main menu includes the following options: Storage, Camera, View, Shape, Draw, Print, And Exit. Those options that are pertinent to the invention are described in further detail below.

At block 64, a test is made to determine if the Camera option has been selected from the main menu, indicating that the user wants to take a picture of a patient. If the Camera option has been selected, a routine to implement this command is called at block 66. A suitable subroutine for this task in illustrated in FIG. 4. Upon return from the Camera routine, the program loops to block 62.

If the Camera option was not selected, a test is made at block 68 to determine if the Storage option has been selected for the main menu, indicating that the user wants to load an image (picture) from computer storage, e.g., a hard drive. If the Storage option was selected, the image(s) to be edited or viewed during the current session are selected at block 70.

At block 72, the selected images are copied to the appropriate buffers in the frame grabbing board, as described in FIG. 2 and the accompanying text. For example, if the selected image is an original image that has not yet been edited, the original image will be copied to the original, modified, and current image buffers. If the selected image is an image that has previously been modified, the original image is copied to the original image buffer 50 and the modified image is copied to both the modified and current image buffers 52 and 54. It will be appreciated that the number of images that may be loaded at one time will be limited, in part, by the capacity of the frame grabbing board. The program then loops to block 62.

Figure 5:
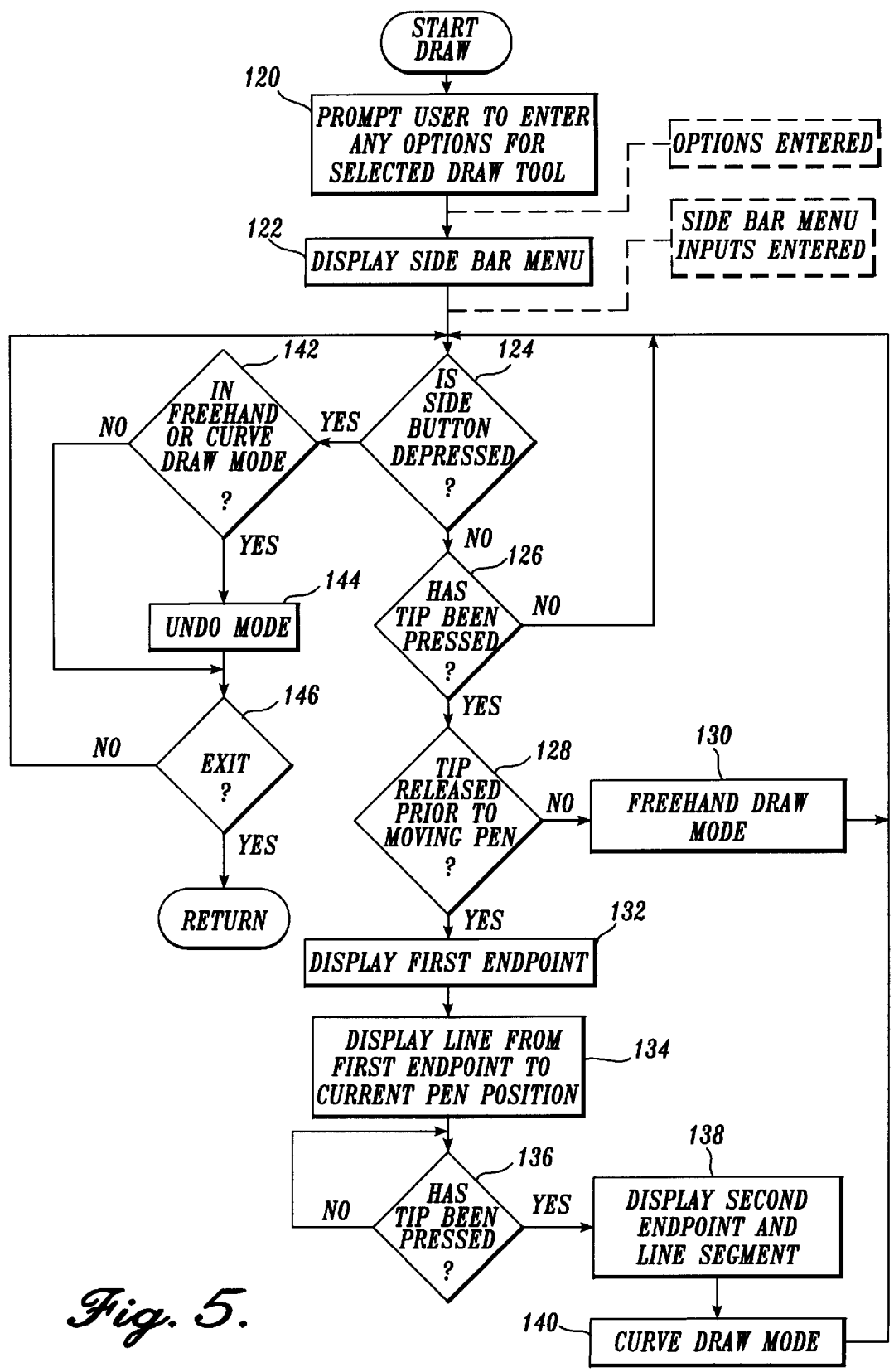
FIG. 5 is a flow diagram of an exemplary routine for implementing a combination tool for use with various drawing (draw) tools in accordance with the invention.

If the Storage option was not selected, a test is made at block 74 to determine if the Draw option has been selected from the main menu. If the Draw option has been selected, a draw tool routine is called at block 76. The program then loops to block 62. A suitable routine for implementing the Draw option is shown in FIG. 5.

Figure 10:
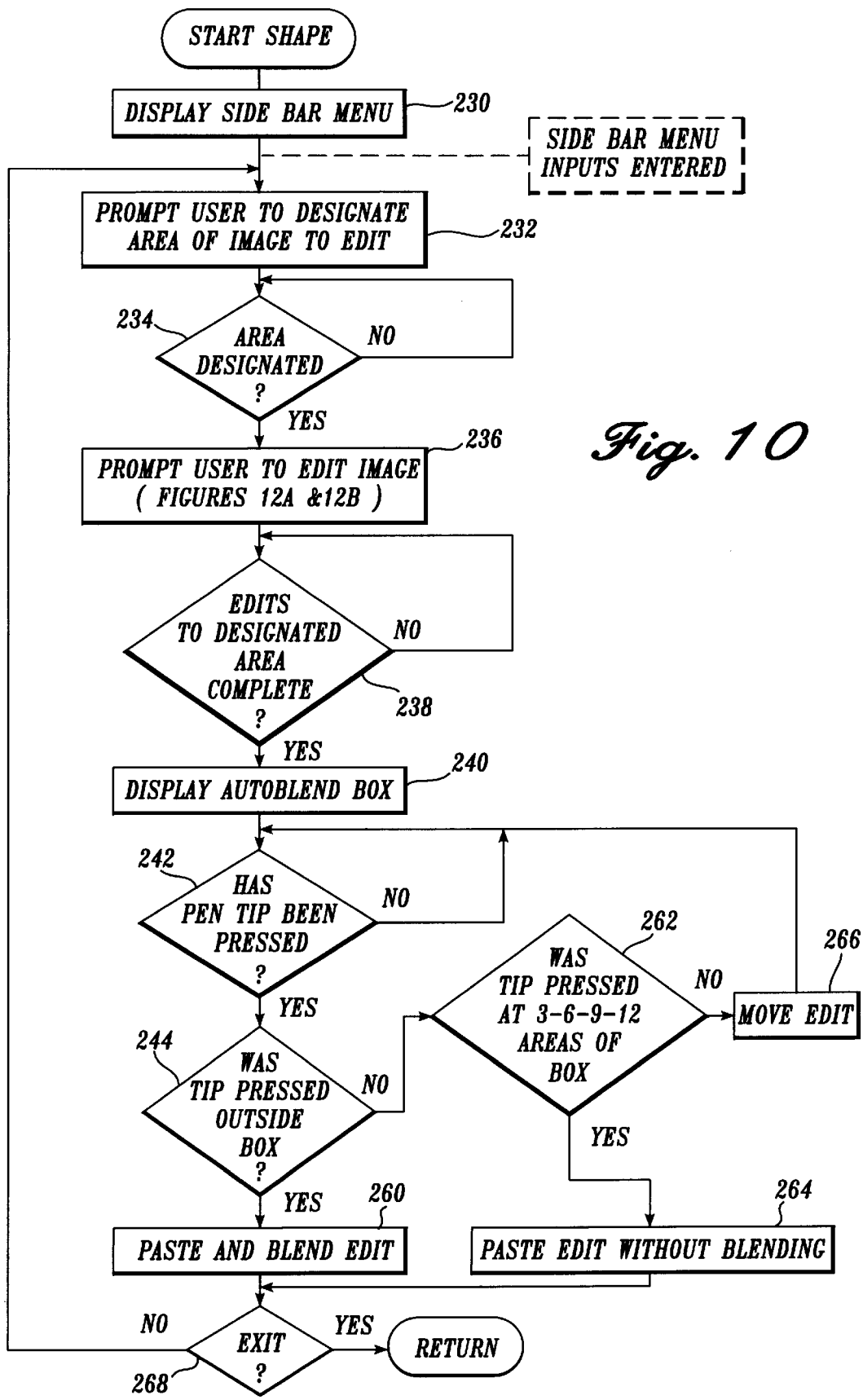
FIG. 10 is a flow chart of an exemplary routine for implementing an autoblend tool in accordance with the invention.

If the Draw option was not selected, a test is made at block 78 to determine if the Shape option has been selected. If the Shape option has been selected, a shape tool routine is invoked at block 82. A suitable routine for implementing the Shape option is shown in FIG. 10. Otherwise, at block 82 a test is made to determine if the View option has been selected.

Figure 13:
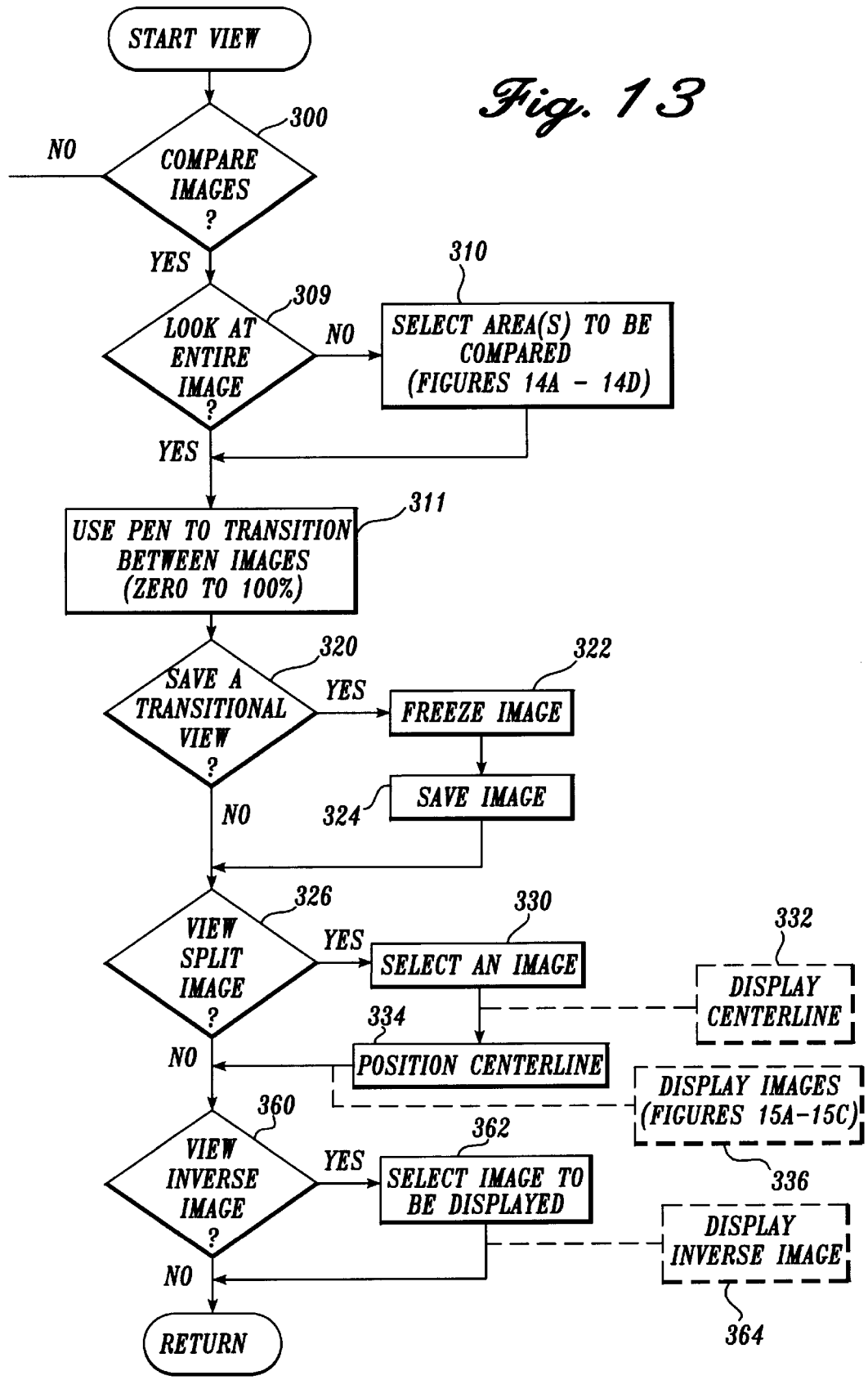
FIG. 13 is a flow chart of an exemplary routine for viewing images in accordance with the invention.

If the View option has been selected, a view subroutine is invoked at block 84. An appropriate routine for the View option is shown in FIG. 13. The program then loops to block 62. At block 86 a test is made to determine whether the Exit option has been selected from the main menu. If not, the program loops to block 62. Otherwise, any edits to the image are saved at block 88. At this point in the program, the image in the current image buffer 54 is saved to the modified image buffer 52, and the working buffer 56 is cleared. The program then terminates.

Taking Pictures of a Patient Using an Inverse Image

Figure 4A:
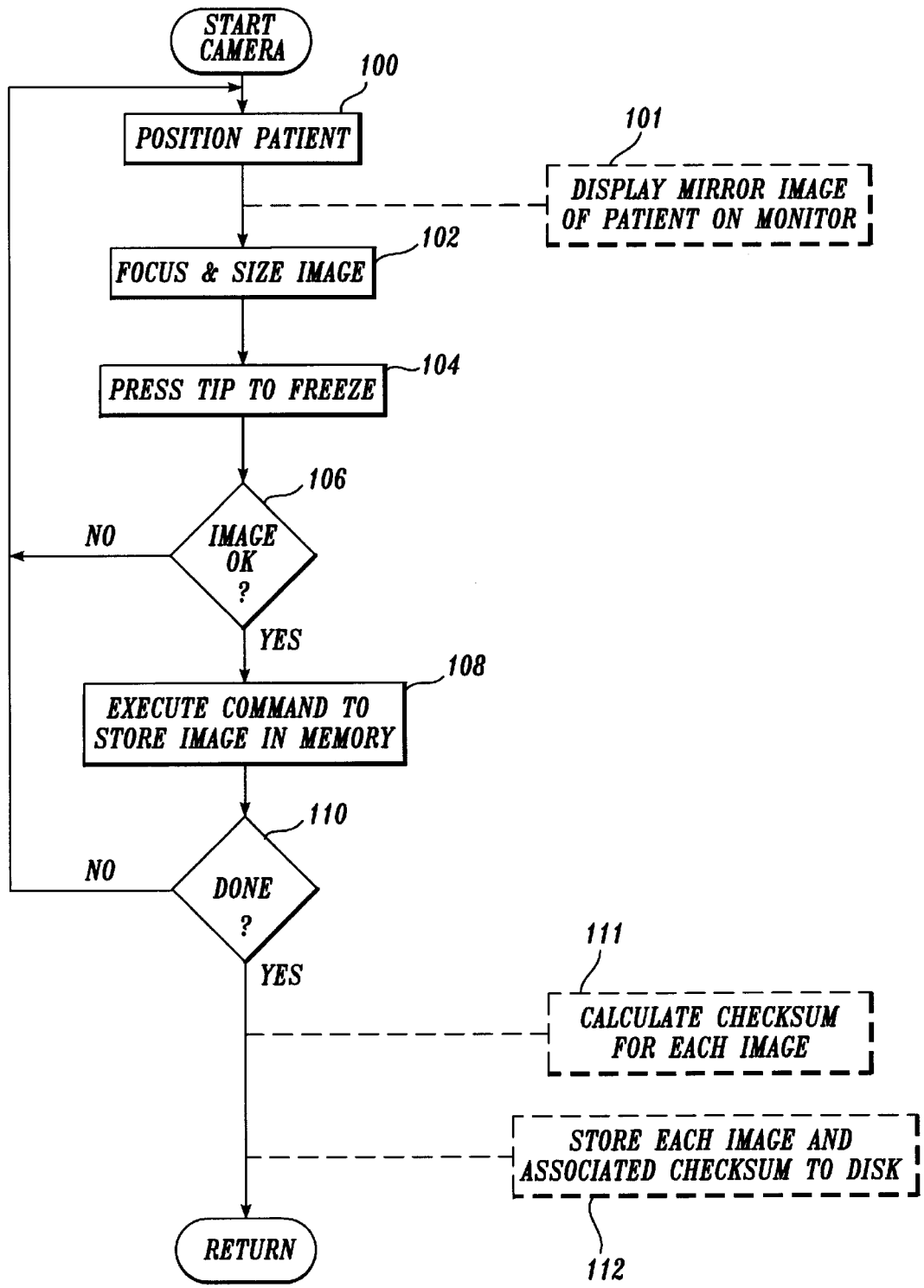
FIG. 4A is a flow chart of an exemplary routine for photographing patients in accordance with the invention.

FIG. 4A illustrates an exemplary user interface that utilizes a video camera for acquiring a digital image of a patient. It is noted a scanner or other input device may also be used to input an image into the aesthetic imaging system. In FIG. 4A, the solid blocks indicate user interface options presented to the user by the aesthetic imaging system and the dashed blocks represent system responses to the decisions made. At block 100, a patient is positioned in front of the video-camera. In a preferred embodiment of the aesthetic imaging system, an inverse or "mirror" image of the patient's image will be displayed on the monitor, as indicated at block 101. The inverse image is computed using data from the original image, and is representative of how patients see themselves day to day when looking into a mirror. More specifically, digital images are comprised of pixels or picture elements. It is known to those skilled in the art how digital image pixels may be manipulated to create an image that is the inverse of the original.

Displaying an inverse image of a patient is advantageous when taking pre- and post-surgical pictures of patients because it allows patients to more easily center or otherwise position themselves on the monitor. Without the pixel manipulation, the input from a camera or other digital device may create confusion when positioning a patient. Under normal viewing, if a patient appears left of center in the monitor, they are in reality too far to the right. In this instance, a typical patient's reaction is to move even further to the right. With a mirror image displayed, the tendency of most patients is to naturally adjust to the desired position.

Figure 16:
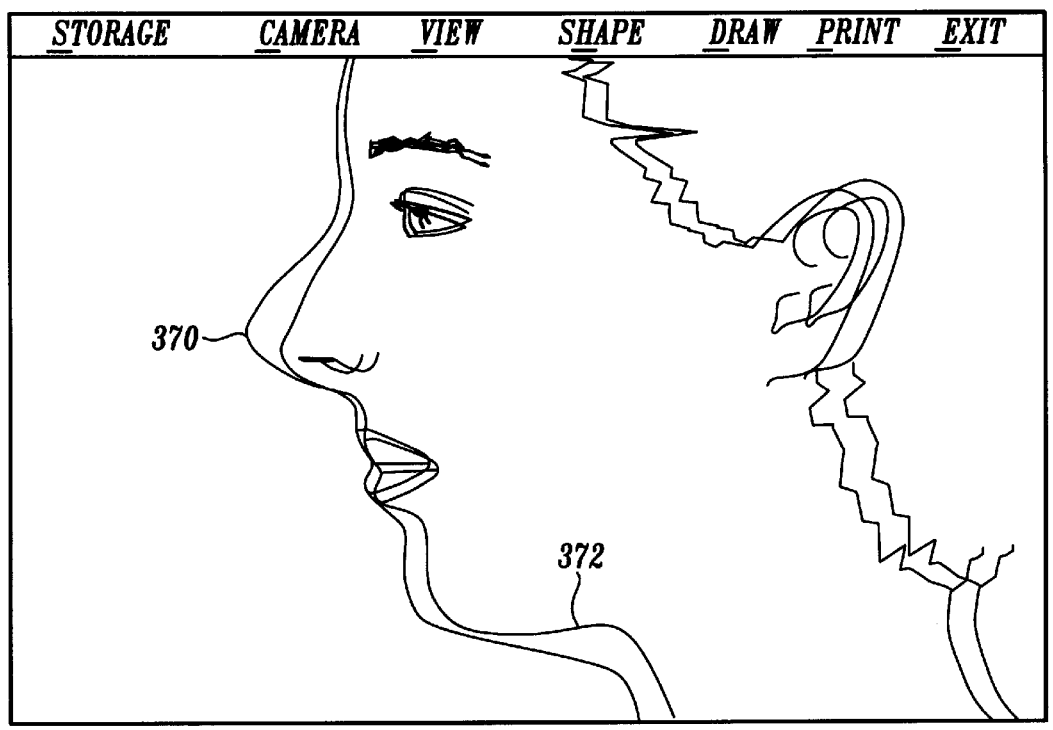
FIG. 16 is a pictorial representation illustrating the use of a translucent image to allow a patient to accurately position themselves in order to capture a second image having the same location and orientation as an original stored image.

The displaying of a mirror image is particularly important when taking post-surgical pictures. In post-surgical pictures, it is advantageous to have the patient in exactly the position they were in when taking the pre-surgical picture. For post-surgical pictures, the aesthetic imaging system will preferably display a translucent inverse image of the pre-surgical picture on the monitor, and then overlay an inverse image of the picture currently being taken. As shown in FIG. 16, a translucent patient image 370, in this case a patient's profile, is displayed on the monitor. The translucent image is the preoperative image taken prior to undergoing a surgical procedure. A "live" video image 372 of the patient is also displayed under the translucent inverse image. By moving the relative positions of the patient and the camera, a user may position the patient in the identical orientation with which they took the presurgical picture. When the patient is appropriately positioned, the tip of the pen may be pressed anywhere on the tablet to freeze the digital image on the monitor. Patients can thus easily align themselves with their former picture to achieve very similar before and after pictures.

Figure 17:
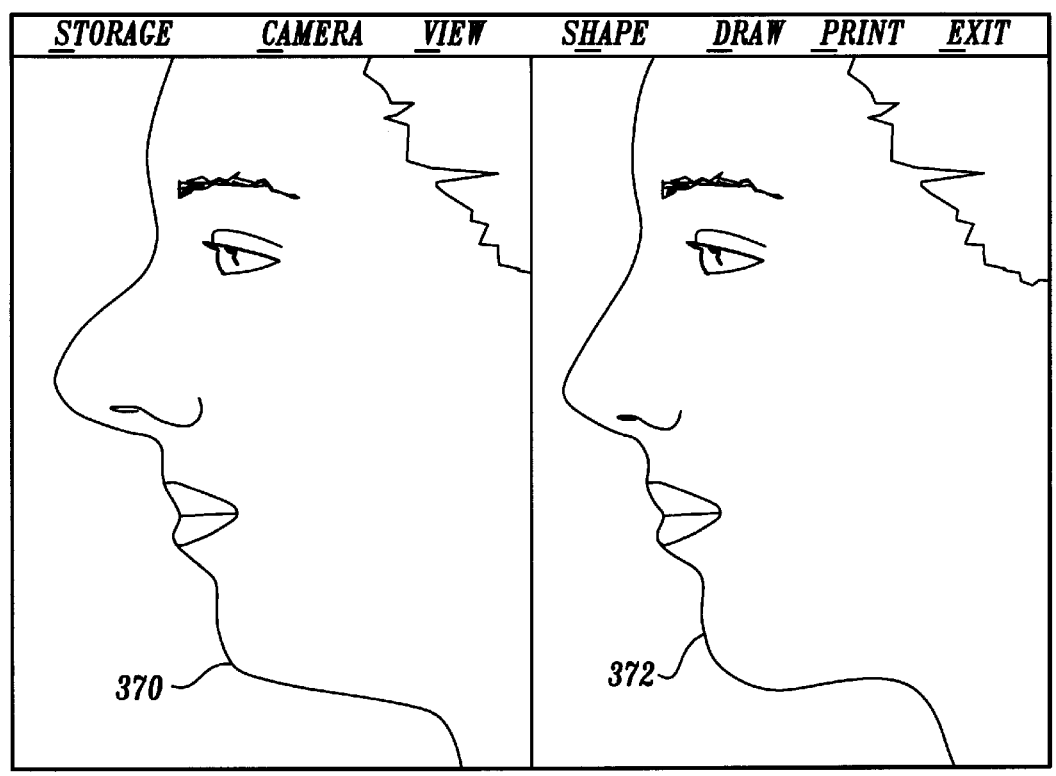
FIG. 17 is a pictorial representation illustrating a compare image wherein a presurgical image of a patient is compared side-by-side with a postsurgical image having the same location and orientation.

The advantage of the translucent method of aligning a patient is shown in the side-by-side display shown in FIG. 17. As shown in FIG. 17, the aesthetic imaging system of the present invention may generate a side-by-side display of the two images to allow a patient to easily and accurately compare a presurgical picture with a post-surgical picture. The left half of the monitor may display the presurgical image 370, and the right half of the monitor may display the post-surgical image 372. Allowing a patient to view the two images side-by-side in precisely the same orientation provides the patient with an accurate impression of the results achieved by surgery.

Upon establishing a desired position for the patient, the image is focused and sized at block 102 by using the aesthetic imaging system to adjust the electronic controls on the video camera. After any adjustments have been made to the camera, at block 104 the tip of the pen is pressed anywhere on the tablet to freeze the digital image onto the monitor. At block 106, the user makes a determination if the image currently displayed on the monitor is acceptable. If the image is not acceptable, the routine loops to block 100. If the image is acceptable, an appropriate command is entered at block 108 and the image is stored in nonvolatile memory for future viewing.

At block 110, a test is made to determine if an exit or other similar command has been entered by the user, i.e., if any more pictures are to be taken. If additional pictures are to be taken, the program loops to block 100. Otherwise, at block 111 a checksum value (described below) is calculated by the imaging program for each (original) image that has been stored. At block 112, the imaging program stores each image and its associated checksum value. The routine then returns to block 68 of FIG. 3.

Determining Authenticity Using Checksum Values The checksum value is an addendum to an original stored image that is used to determine its authenticity when the image is subsequently displayed or printed. Those skilled in the art will recognize that there are a number of methods of implementing such a checksum procedure. For example, one checksum computation is to add up the grayscale values for one of the colors, i.e., red, green, or blue, for each pixel comprising the image. Assuming a screen of 640 by 480 pixels and 256 colors per pixel, the checksum values would range from 0 to (640)(480)(255). When an image is recalled for display or to be printed, the checksum value is recalculated. If the image has not been modified, the newly calculated checksum value will be equivalent to the addendum value, and the image is certified as being unaltered. If the image has been modified, the checksum values will vary, indicating the image has been modified. In this instance, an indication of the fact that the image has been modified may be displayed or printed with the image, if desired.

The authentication of an original image using a checksum value is ideal for situations in which physicians display before and after pictures of a patient who has undergone cosmetic surgery. In some instances, viewers are skeptical as to whether an "after" image is really representative of a patient's appearance after surgery. This is in reaction to beliefs that post-surgical images have been altered to make the patients look better. For example, there may be temptation to slightly fade wrinkles or otherwise edit features that the physician was attempting to address in a surgery.

Using the described checksum feature, the post-surgery image can be verified as an authentic, unaltered image based upon the addendum value, and the veracity of the image is not questioned. This is beneficial to physicians when illustrating post-surgical results during lectures or in other teaching situations.

Figure 4B:
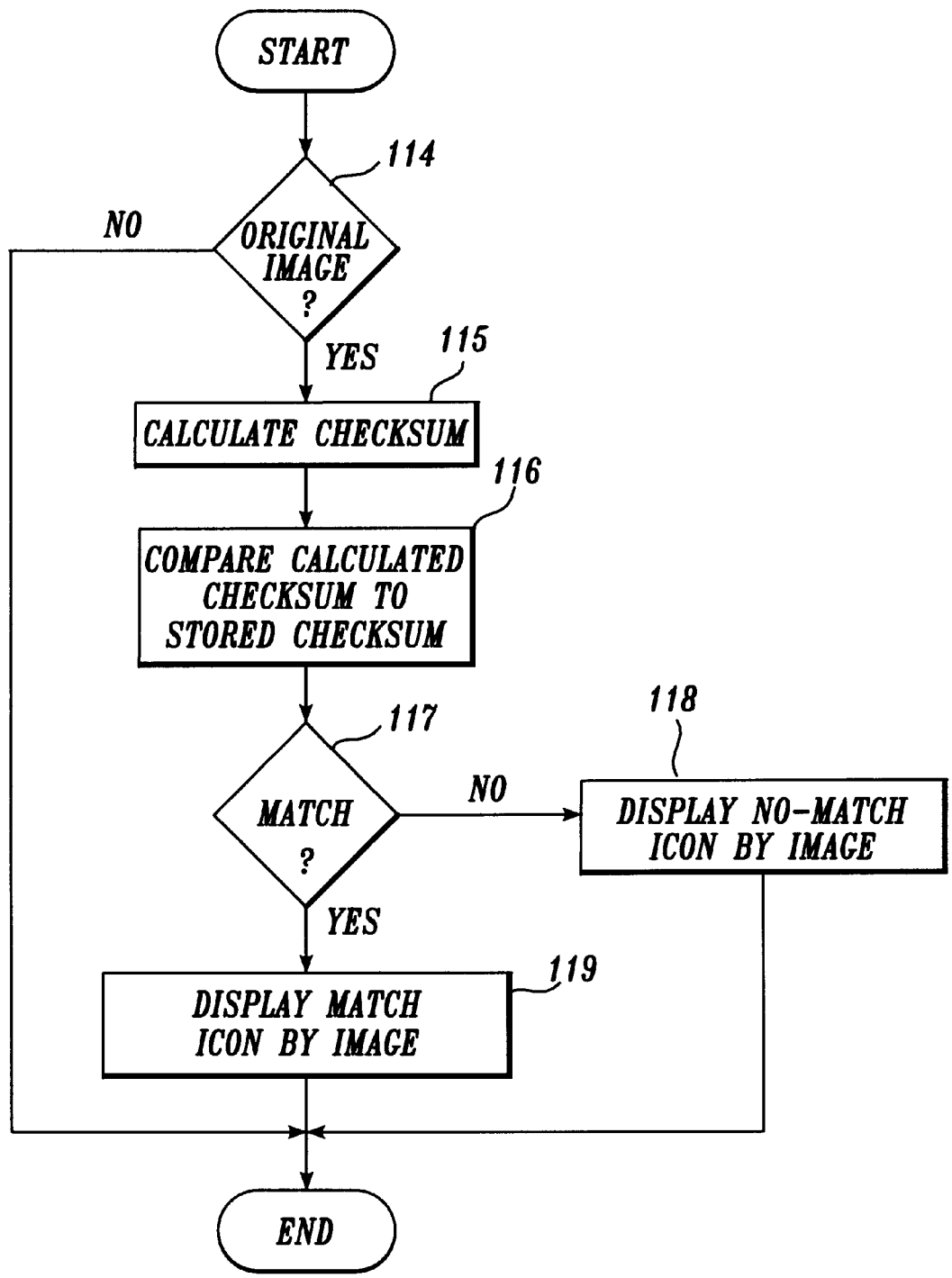
FIG. 4B is a flow chart of an exemplary routine for calculating a checksum value and comparing the calculated value to a previously stored value to determine if an image has been altered.

FIG. 4B illustrates an exemplary routine for determining whether or not an original image, i.e., pre- or post-surgical image, has been altered in accordance with the invention. This routine may be invoked whenever a pre- or post-surgical image is displayed on a monitor or printed on a page. At block 114, a test is made to determine whether the image to be displayed is portrayed as an "original image" that was not modified, e.g., a before or after picture. If the image is supposed to be an original image, a current checksum value for the image is calculated at block 115. At block 116, the calculated checksum value for the image is compared to the checksum that was stored when the image was acquired by the aesthetic imaging system, e.g., when the picture was taken.

At block 117, the calculated checksum value is compared to the stored checksum value to see if they are equivalent. If the two values are not equivalent, at block 118 an icon is added to the image, e.g., displayed or printed along with the image, indicating that the image has been altered. If the checksum values are equivalent, an icon is added to the image at block 119 verifying the authenticity of the image. Once either icon has been added to the image, or if the image being printed or displayed is not an original image, the program terminates. As will be appreciated, the same checksum computational method must be used on each image, i.e., when an original image is acquired and when an image is to be displayed, or the comparison will be meaningless.

While the use of a checksum is contemplated in the exemplary routine for determining whether an original image has been altered, it will be appreciated that other techniques may be used to detect when an original digital image has been modified. For example, a flag or other marker may be uniquely associated with the original digital image. If the flag or other marker is absent from the digital image being displayed, the digital image is a copy that is presumed to have been changed.

Alternatively, two versions of the image may be stored, included an unaltered original and a copy. The two images may be compared in order to determine whether modifications have been made to the copy.

The editing aspects of the invention are now described.

Editing Using Draw Tools

A disadvantage of prior art aesthetic imaging systems is that a physician or facilitator may have to cycle back and forth between several menus in order to properly edit an image. In an effort to minimize the number of menus required, the imaging program includes a unique combination draw (CD) feature that generally works with all of the drawing tools. The CD feature allows a user to freehand draw, use curves to edit an image, as well as undo using either freehand or curves, without having to invoke a separate menu for each item.

The following describes an interface for the CD feature as implemented in an embodiment of the invention. For purposes of this discussion, it will be assumed that the airbrush tool is selected as the drawing tool, although it is to be understood that the CD tool generally applies to all of the drawing tools. Upon selection of the airbrush draw tool, the aesthetic imaging system prompts the user to choose a color from a color palette that appears on the monitor. A color is selected using the pen. After selecting a color, a side bar menu is displayed. The user may select from a number of options on the side bar, including brush size and intensity, or select away from the side bar menu to remove the menu from the screen. In the latter case, the system defaults are used.

To freehand draw, the user presses on the tablet with the pen tip and continues pressure while moving or "rubbing" the pen on the tablet. At this point the chosen color is written onto the image at the location on the monitor that corresponds to the pen location. Pressing the side bar while repeating the motion will allow the user to selectively remove any edits to the image using a freehand motion.

To draw a curve, the user must set a first anchor point by selecting with the pen. Thereafter, as the user moves or "floats" the pen across the tablet, a green line will extend from the first anchor point to the current position of the pen. In a desired location, a second anchor point is set by selecting with the pen. Once both anchor points have been established, the green line appears on the monitor as a segment between the two anchor points. To create a curve, the user floats the pen across the tablet. The system will display a curved line bending and moving with the movement of the pen. The pen movement (top to bottom, or side to side) determines the arc of the curve. As the curve moves across the image, the image is edited in accordance with the selected draw tool and draw tool options. With the airbrush example, the system displays the curved line repeating itself with the chosen color. Pressing the side bar while repeating the motion will allow selective removal of any edits to the image using a curve established between the anchor points.

FIG. 5 illustrates an exemplary routine for implementing the CD feature of the imaging program. In one embodiment of the invention, the draw tool group includes: Airbrush, Tint, Texture, Blend, Undo, and Contour. Once a draw tool is selected from the main menu at block 74 of FIG. 3, the routine of FIG. 5 begins and selections must be made, or default selections confirmed, for the selected draw tool. Specifically, at block 120 the user is prompted to enter any options that are applicable to the draw tool selected. The airbrush tool will be described as an example. With airbrush, a color must be chosen. After a color has been chosen, a side bar menu is displayed at block 122 which illustrates other options that may be invoked for the airbrush tool. These typically include selecting a brush size, brush intensity, and other miscellaneous options. Sample side bar menus for various shape tools are described below. The draw tool side bar menus are similar to these.

Once the side bar menu options are entered, a test is made at block 124 to determine if the side button has been depressed. Pressing the side button can mean a cancel/backup or an "undo," depending upon when it is activated. It is noted that at any point during the draw routine and the other routines described below, the side button may be used to return to the main menu through multiple backup or cancel commands.

If the side button has not been pressed, a test is made at block 126 to determine if the tip of the pen has been pressed. If the tip has not been pressed, the routine loops to block 124. Otherwise, a test is made at block 128 to determine if the tip was released prior to moving the pen. If the pen has been moved while the pen tip was pressed against the tablet, the imaging program enters freehand draw mode, shown at block 130. In one embodiment of the invention, freehand draw mode is entered if the pen moves the equivalent of three or more pixels. While in freehand draw mode, freehand edits may be made to the image in a manner similar to prior art imaging programs. This mode will remain until pressure on the pen tip is released. After beginning freehand draw mode, the routine loops to block 124.

If the pen was not moved, e.g., the pen has been moved two pixels or less prior to releasing the tip, the imaging program begins a curve mode by establishing a first endpoint, as indicated at block 132, and drawing a line on the monitor from the endpoint to the current pen position, indicated at block 134. At block 136, a test is made to determine if the tip has been pressed. The imaging program at this point is looking for a second endpoint to be entered. If not, the program loops back to block 136 to await the input. As noted above, the user can go back to the beginning of the routine using the cancel button if the user has changed his or her mind, although this is not shown in the flow diagram. Specifically, the first cancel would place the routine at block 124, the second at either block 122 or 124, depending on the draw tool selected, and subsequent cancels would forward the routine to the main menu.

Once the tip is pressed, the second endpoint is established at the tip position, and a line segment is drawn on the monitor from the two endpoints, as indicated at block 138. At this point in the routine, the imaging program is in "curve draw mode" as indicated at block 140, and the user can make any edits desired using a curvilinear line segment having the established endpoints. The routine loops to block 124 while in this mode.

With reference to block 124, if the side button has been depressed a test is made at block 142 to determine if the imaging program is in either the freehand or curve draw modes. If the imaging program is in either mode, an undo mode will be invoked as long as the side button remains depressed, as indicated at block 144. If at the time of depressing the side button the imaging program is in freehand draw mode, the undo will also be freehand. Selective freehand undo edits are thus available. Similarly, if at the time of depressing the side button the imaging program is in curve draw mode, the undo will be in this mode. Selective "undo" edits are then available using a curve, as opposed to freehand drawing. Releasing the side button will return the imaging program to the drawing mode that was active just prior to depressing the side button.

Once the side button is released, or if the imaging program was not in either drawing mode, a test is made at block 146 to determine if the user wishes to exit. This test generally refers to the user again depressing the side bar, and thus "backing out" of the drawing routine. In this case, the draw routine returns to block 78 of FIG. 3. Otherwise, the routine branches to block 124.

Figure 6:
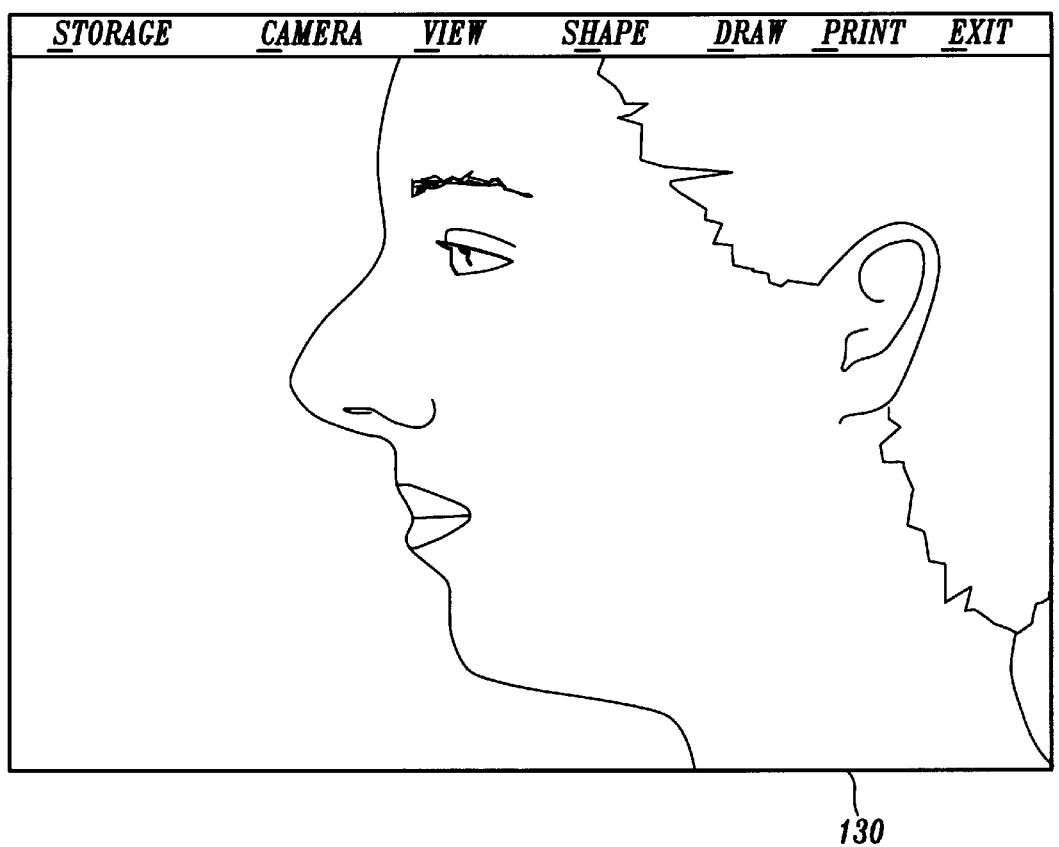
FIG. 6 is a pictorial representation of an image to be edited.

To further exemplify the advantages of the CD draw tool described in FIG. 5, an original (unedited) image 130 that is representative of an image displayed on a monitor is illustrated in FIG. 6. A main menu 132 is displayed across the top of the image to allow a user to select editing, viewing and printing options, as discussed in FIG. 3 and accompanying text. The main menu 132 is from an embodiment of the aesthetic imaging system 20.

FIGS. 7A–7E and 8A–8E contrast exemplary steps taken to make identical edits to the image 130. The steps required to modify the image using a relatively advanced prior art imaging system are illustrated in FIGS. 7A–7E. These steps are modeled after a prior art imaging system that has been distributed by Mirror Image Technology, Inc., a division of Virtual Eyes, Incorporated, the assignee of the present invention. The steps required using an embodiment of the aesthetic imaging system 20 in accordance with the invention are illustrated in FIGS. 8A–8E. Briefly, each set of drawings illustrates examples of edits to a patient's nose, chin, and neck regions. The edits are for use in explaining the invention only, and merely exemplary in nature.

Figure 7E:
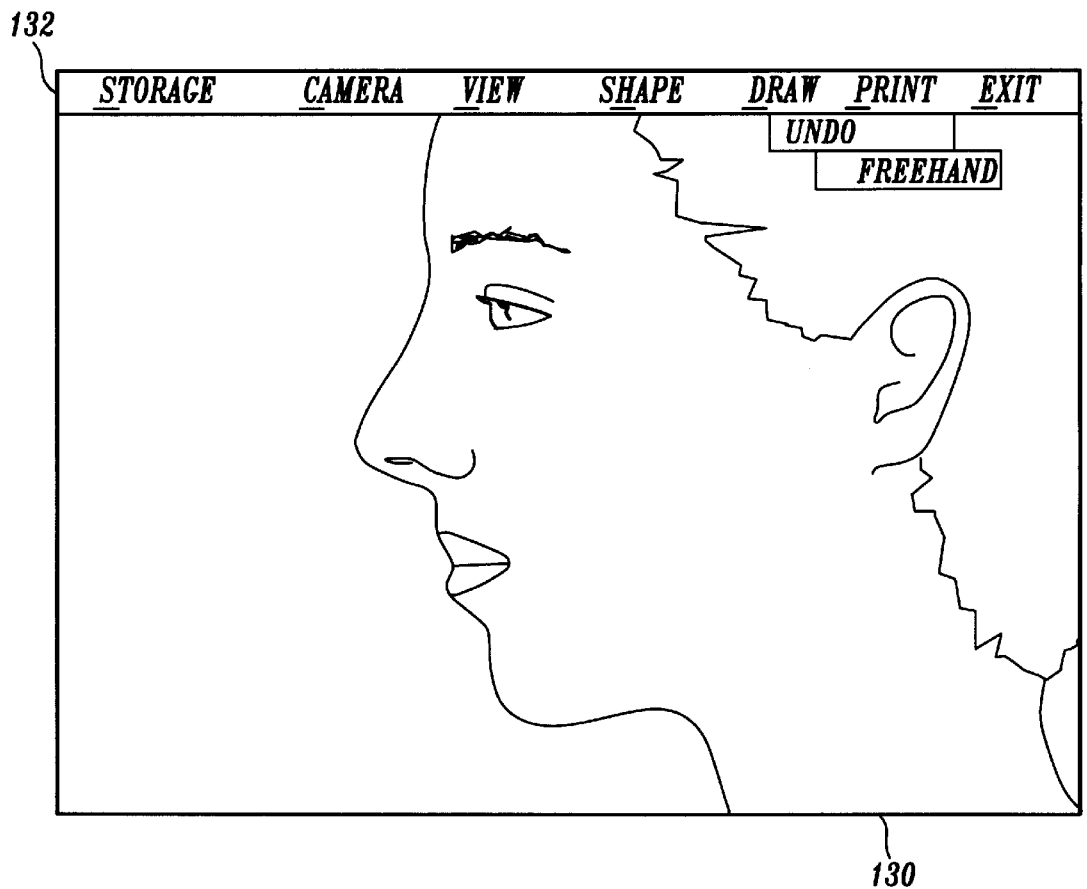

A brief description of the edits follows. With reference to FIG. 7A, the curve option of an airbrush tool is used to modify the bridge of a patient's nose. A resultant curve 134 is displayed having anchor points (endpoints) 136 and 138. In FIG. 7B, a freehand motion is used to eliminate a portion of the tip of the patient's nose. In FIG. 7C, an undo tool is used to replace a portion of the bridge of the patient's nose that was removed by the edits performed in FIG. 7A. In FIG. 7D, the neck area of the patient has been edited using the curve option of an airbrush tool. The resultant curve 140 has anchor points 142 and 144. Finally, in FIG. 7E, an undo tool is used to add back a portion of the neck area that was removed in FIG. 7D. These edits require the following steps:

FIG. 7A:

Step S1 move pen to draw on main menu;

Step S2 select draw;

Step S3 move pen to airbrush;

Step S4 select airbrush;

Step S5 move pen to curve;

Step S6 select curve;

Step S7 select an airbrush color;

Step S8 move pen to the first anchor point position;

Step S9 select at the position to establish the anchor point 136;

Step S10 move pen to the second anchor point position;

Step S11 select at the position to establish the anchor point 138;

Step S12 move pen to bend the curve 134 into the bridge of the nose;

FIG. 7B:

Step S13 press the side button on the pen to exit to the main menu;

Step S14 move pen to draw;

Step S15 select draw;

Step S16 move pen to airbrush;

Step S17 select airbrush;

Step S18 move pen to freehand;

Step S19 select freehand;

Step S20 select a color for the airbrush tool;
Step S21 use a rubbing motion with the pen to make the freehand edit;
FIG. 7C:
Step S22 press the side button on the pen to exit to the main menu;
Step S23 move pen to draw;
Step S24 select draw;
Step S25 move pen to undo;
Step S26 select undo;
Step S27 move pen to curve;
Step S28 select curve;
Step S29 use a rubbing motion with the pen to undo the previous edit;
FIG. 7D:
Step S30 press the side button on the pen to exit to the main menu;
Step S31 move pen to draw;
Step S32 select draw;
Step S33 move pen to airbrush;
Step S34 select airbrush;
Step S35 move pen to curve;
Step S36 select curve;
Step S37 select color to be used by the airbrush tool;
Step S38 move pen to the first anchor point position;
Step S39 select at the position to establish the anchor point 142;
Step S40 move pen to the second anchor point position;
Step S41 select at the position to establish the anchor point 144;
Step S42 move pen to bend the curve 140 toward the neck, thereby making the edit shown.
FIG. 7E:
Step S43 press the side button on the pen to exit to the main menu;
Step S44 move pen to draw;
Step S45 select draw;
Step S46 move pen to undo;
Step S47 select undo;
Step S48 move pen to freehand;
Step S49 select freehand;
Step S50 use a rubbing motion with the pen to undo a portion of the previous edit; and
Step S51 press the side button to exit back to the main menu.

Figure 8A:
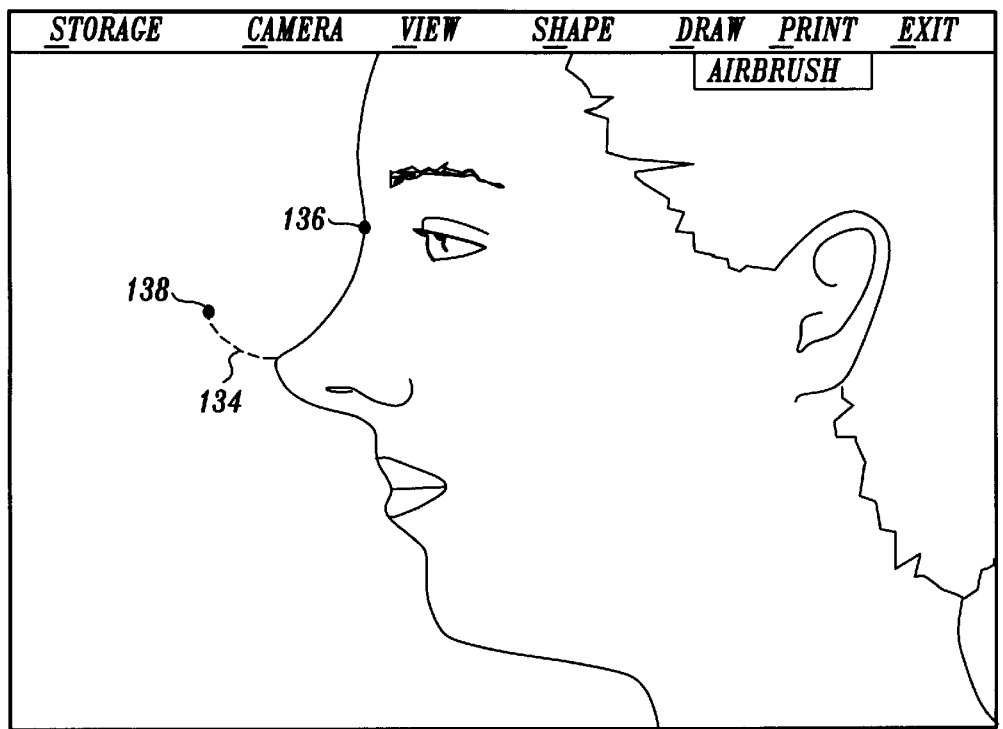
FIGS. 8A–8E are pictorial representations of using the aesthetic imaging system to accomplish the identical edits shown in FIGS. 7A–7E.
Figure 8B:
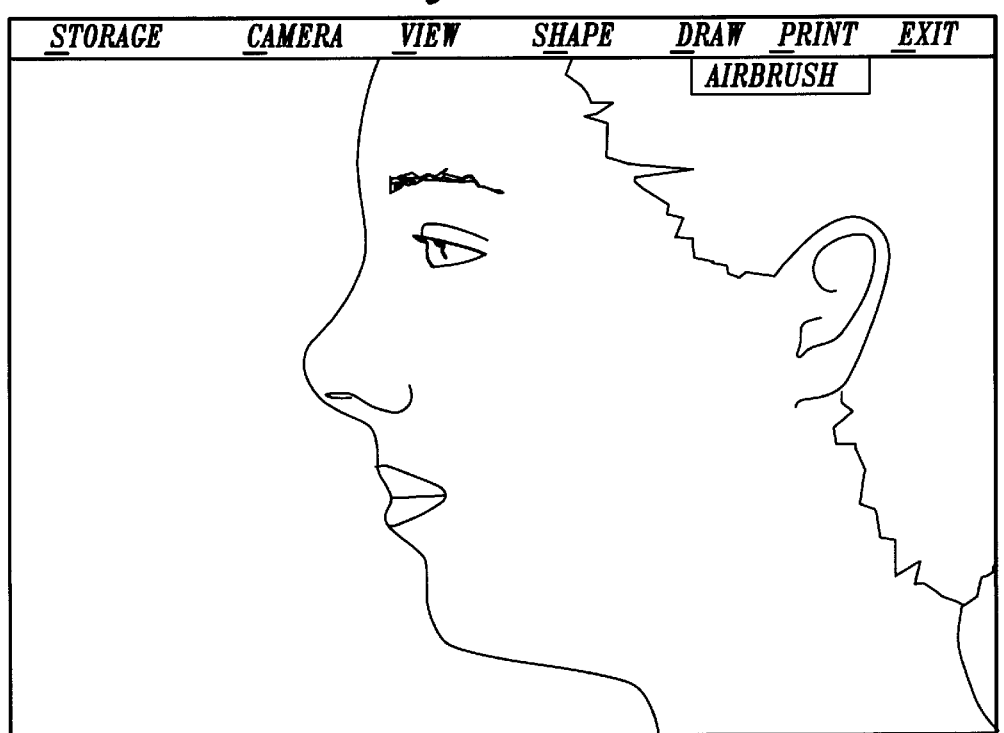
Figure 8C:
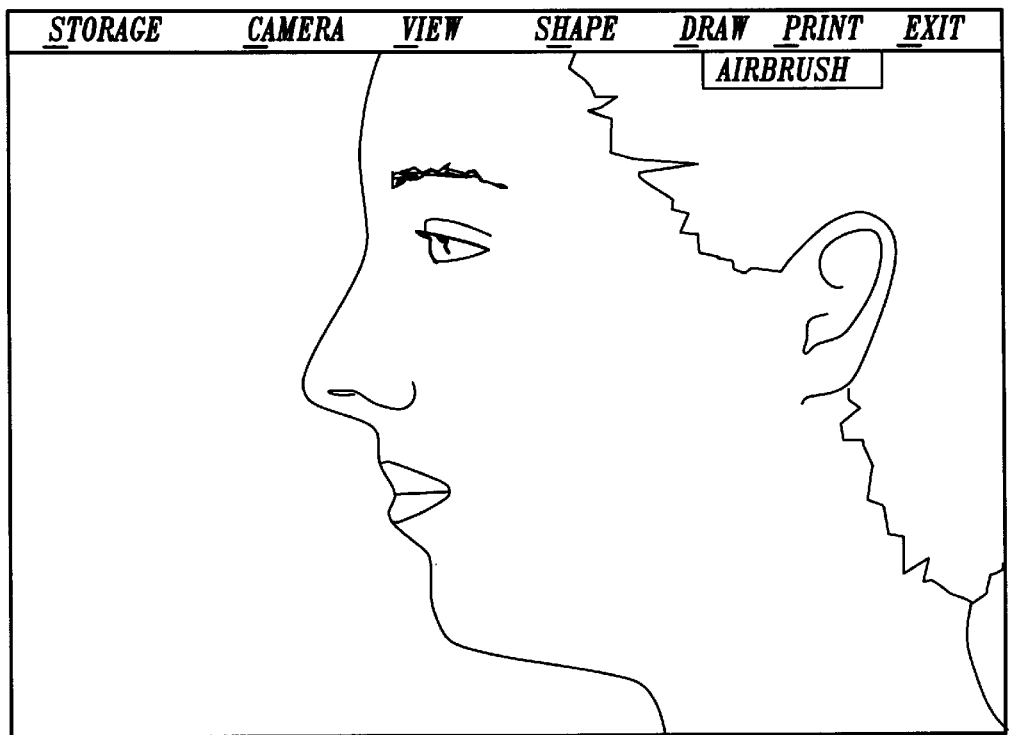
Figure 8D:
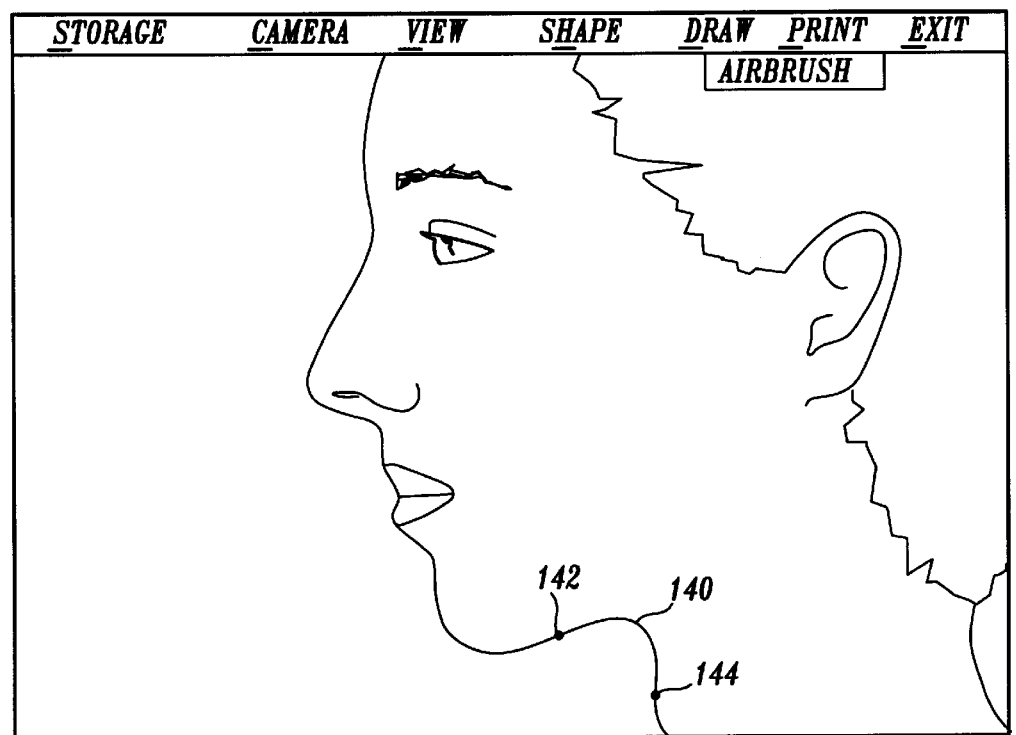
Figure 8E:
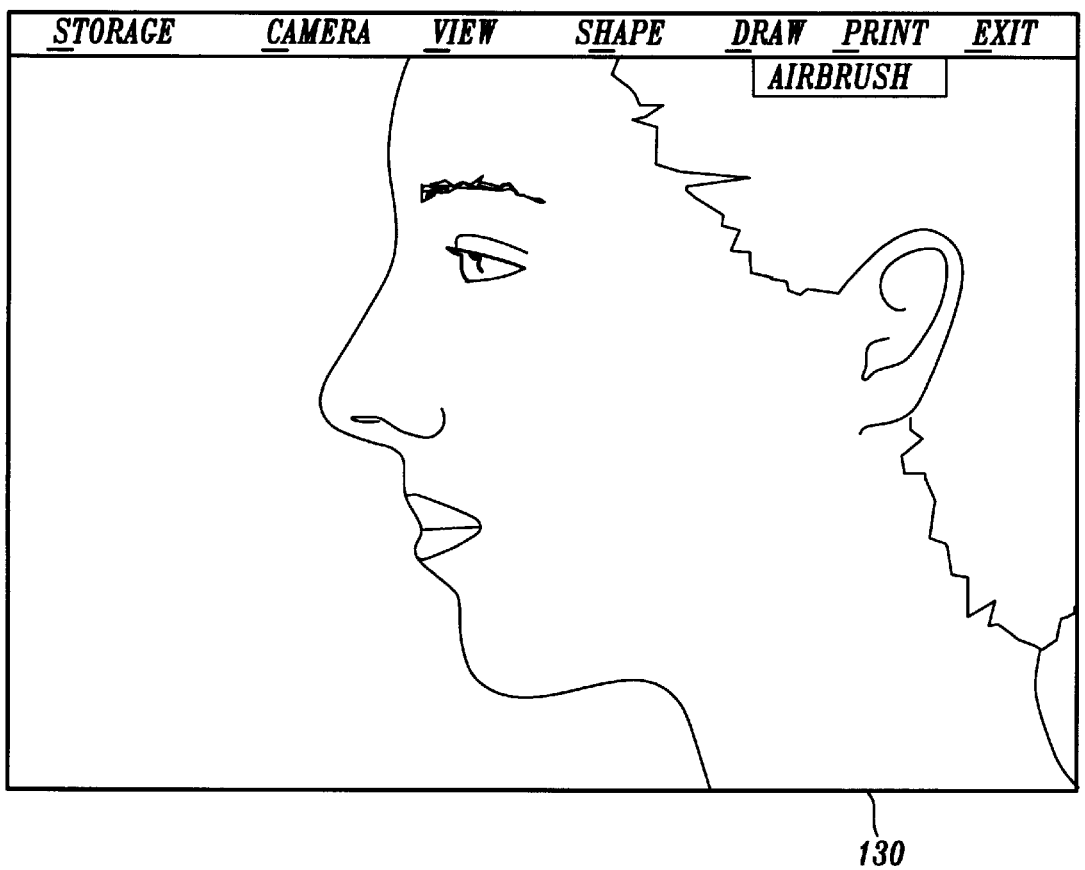

In accordance with the invention, the steps required to perform the same edits using the aesthetic imaging system 20 are now described. With reference to FIG. 8A–8E, the steps required to perform the edits include:
FIG. 8A:
Step N1 move pen to draw;
Step N2 select draw;
Step N3 move pen to airbrush;
Step N4 select airbrush;
Step N5 elect any color for the airbrush tool
Step N6 move pen to the first anchor point position;
Step N7 select at the position to establish the anchor point 136;
Step N8 move pen to the second anchor point position;
Step N9 select at the position to establish the anchor point 138;
Step N10 move pen to bend the curve 134 into the bridge of the nose;
FIG. 8B:
Step N11 pressing the tip of the pen against the tablet and use a rubbing motion to make the freehand edit.
FIG. 8C:
Step N12 pressing the tip of the pen and the side button simultaneously, and maintain pressure while rubbing in the area to be undone;
FIG. 8D:
Step N11 move pen to the first anchor point position;
Step N12 select at the position to establish the anchor point 142;
Step N13 move pen to the second anchor point position,
Step N14 select at the position to establish the anchor point 144;
Step N15 move pen to bend the curve 140 toward the neck, thereby making the edit shown.
FIG. 8E:
Step N16 press tip of pen and the side button simultaneously, while rubbing to undo a portion of the previous edit; and
Step N17 release pressure on the pen and side button, and press the side button to return to the main menu.

From the simplified edits shown in FIGS. 7A–7E and FIGS. 8A–8E, it will be apparent that the aesthetic imaging system 20 provides a distinct advantage over prior art systems. Specifically, patients find the continued back and forth motions required to select necessary tools from the main menu to be disconcerting. The aesthetic imaging system 20 simplifies the editing process by providing freehand, curve, and undo options in the pen commands themselves, instead of in separate pull-down menus as is done in the prior art. The combination of tools is extremely effective in performing edits quickly, efficiently, and nearly seamlessly, all of which benefit both patient and physician during the consultation process.

Figure 9A:
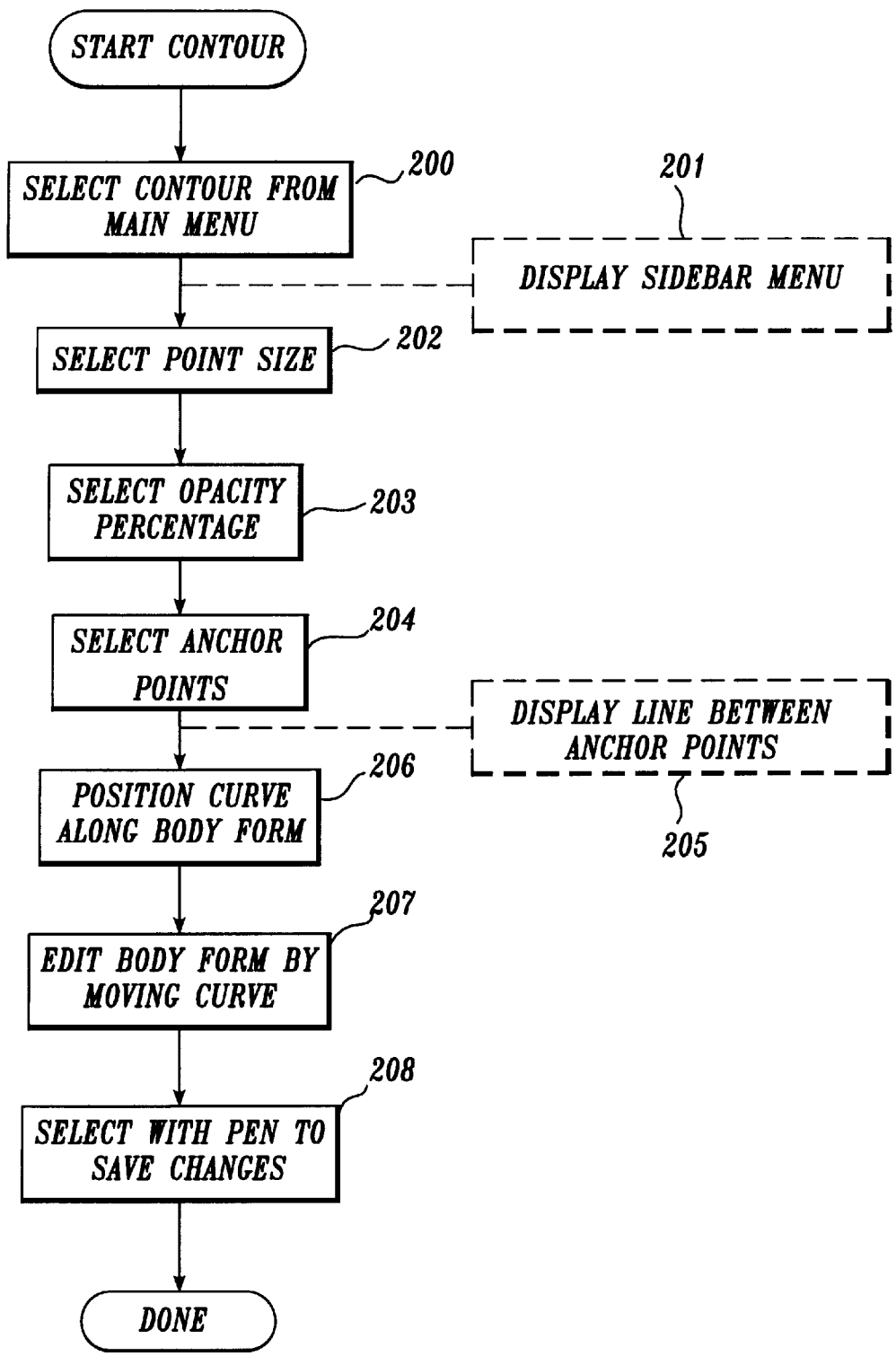
FIG. 9A is a flow chart of an exemplary routine of a contour tool in accordance with the invention.

FIG. 9A illustrates a user interface for a contour tool for use in editing images in accordance with the invention. The contour tool is invoked from the main menu of the imaging program, as indicated at block 200. The contour tool has similarities to a blend tool, but utilizes pixel manipulation to pull pixels from one area to another. For example, the tool works great for chin and lip augmentations.

After the contour tool has been selected, a side bar menu is displayed by the aesthetic imaging system, as indicated at block 201. At block 202, the point size for the tool may be selected from the side bar menu. At block 203, an opacity percentage is entered by the user. If the opacity is at 100 percent, any areas affected by the edit are completely covered by the replacement pixels. As the percentage is reduced, more and more of the original pixels will remain, creating a blending of the replacement and prior pixels.

Anchor points are selected at block 202. The selection is accomplished as described in blocks 128 and 130 of FIG. 5. As also described, once the anchor points are selected, a line is displayed between the points by the aesthetic imaging system, as indicated at block 205. At block 204, a curve having the anchor points as endpoints is positioned along a part of the body, e.g., lips or chin, to be edited. The body part is then edited by dragging the curve in the direction in which a body part is to be augmented. Edits made in block 206 are saved at block 208 by pressing and then releasing the tip of the pen. The program then terminates.

Figure 9C:
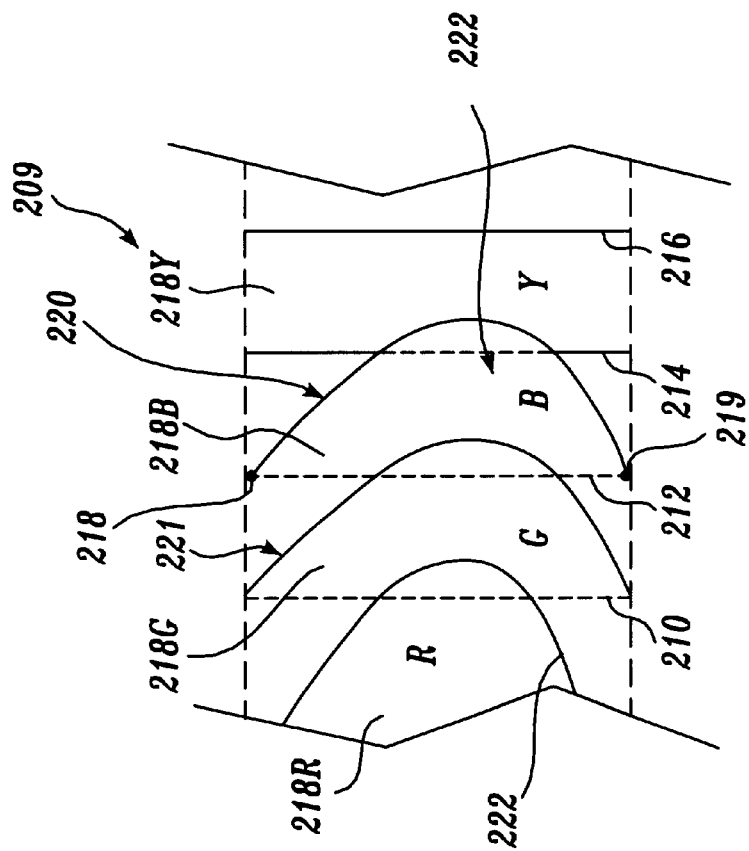
FIGS. 9B–9C are pictorial representations illustrating the function of the contour tool of FIG. 9A.
Figure 9B:
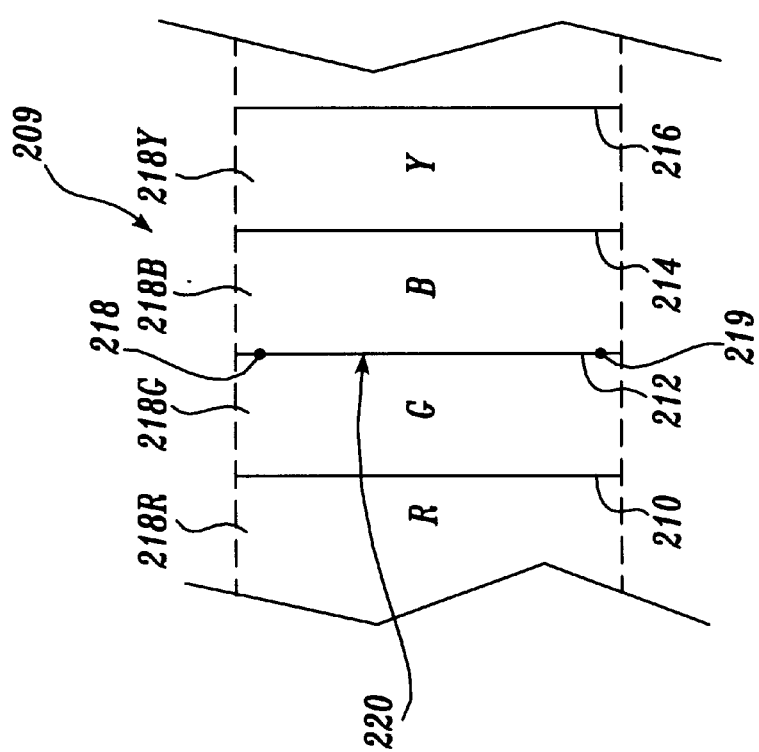

FIGS. 9B–9C further describe the operation of the contour tool, by illustrating how pixels are replicated from one area of an image to another. The image areas described are for exemplary purposes only, and are simplified for clarity in this discussion. With reference to FIG. 9B, an area 209 of an image is comprised of red 218R, green 218G, blue 218B, and yellow 218Y areas separated by boundary lines 210, 212, 214, and 216. It is assumed that a pair of anchor points 218 and 219 have been established by a user along the boundary 212, wherein the aesthetic imaging system will display a line segment 220 between the two anchor points.

In FIG. 9C, it is assumed that the user has moved the midsection of the line segment 220 to the right. In this instance, the blue area 218B has been stretched into the yellow area 218Y. This area is bounded by the line segment 220 (now curved) and the boundary line 214. Also, the green area 218G has been stretched into the blue area 218B. This area is bounded by a curved line segment 221 and the boundary line 212. The red area 218R has expanded into the green area 218G; this area is bounded by a curved line segment 222 and the boundary line 210.

If the opacity level is at 100 percent, the newly defined areas will be comprised of the color being expanded. Thus, the area bounded by segments 220 and 221 will be blue; the area bounded by segments 221 and 222 will be green; and the area bounded by segment 222 to the left edge of the diagram will be red.

If the opacity level is less than 100 percent, pixels from the underlying image areas that are being written over by the newly defined areas will be blended into the newly defined areas. At an opacity of 80 percent, for example, the area bounded by segments 220 and 221 will still be primarily blue, but the portion of this area bounded by the segment 220 and the boundary line 214 may have a yellow tinge; and the portion of this area bounded by the boundary line 212 and segment 221 may have a green tinge. As the opacity percentage is dropped, the effects on these areas will be even greater.

While somewhat simplistic, the illustration in FIGS. 9B and 9C describes the function of the contour tool and the effect on more complicated pixels patterns will be appreciated by those skilled in the art. The area bounded by segment 220, boundary line 214, segment 221, and boundary line 212 will not be affected by changes in the opacity setting.

FIGS. 9D–9G illustrate edits to a patient's lips 224 using the contour tool.

Figure 9D:
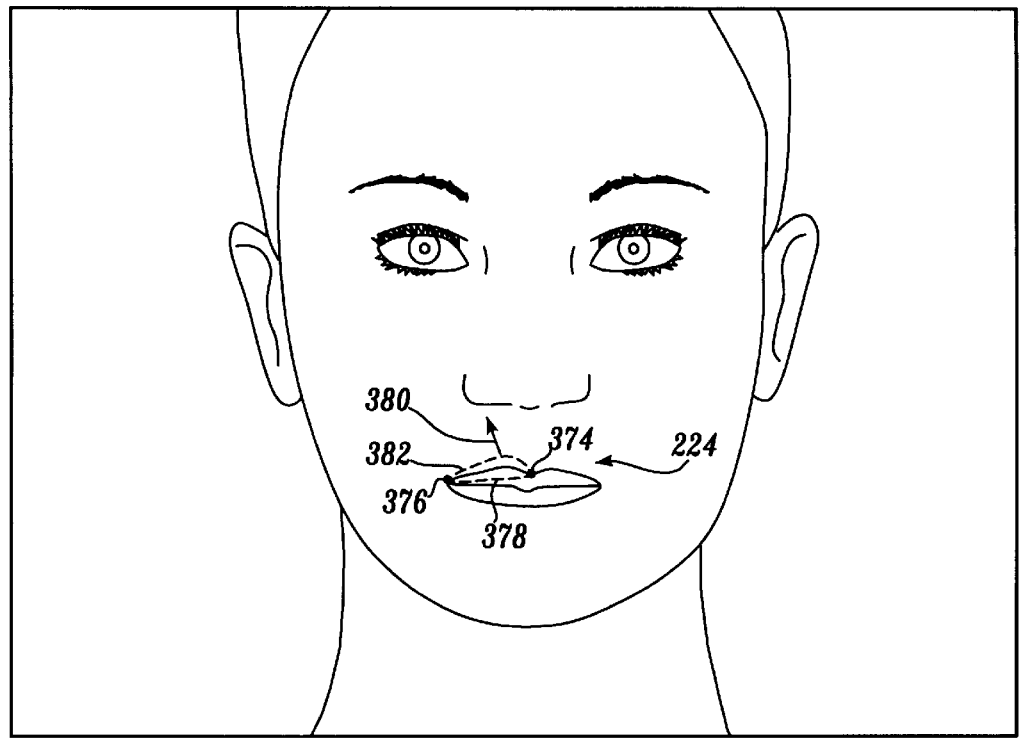
FIGS. 9D–9G are pictorial representations illustrating exemplary edits that may be accomplished using the contour tool.
Figure 9E:
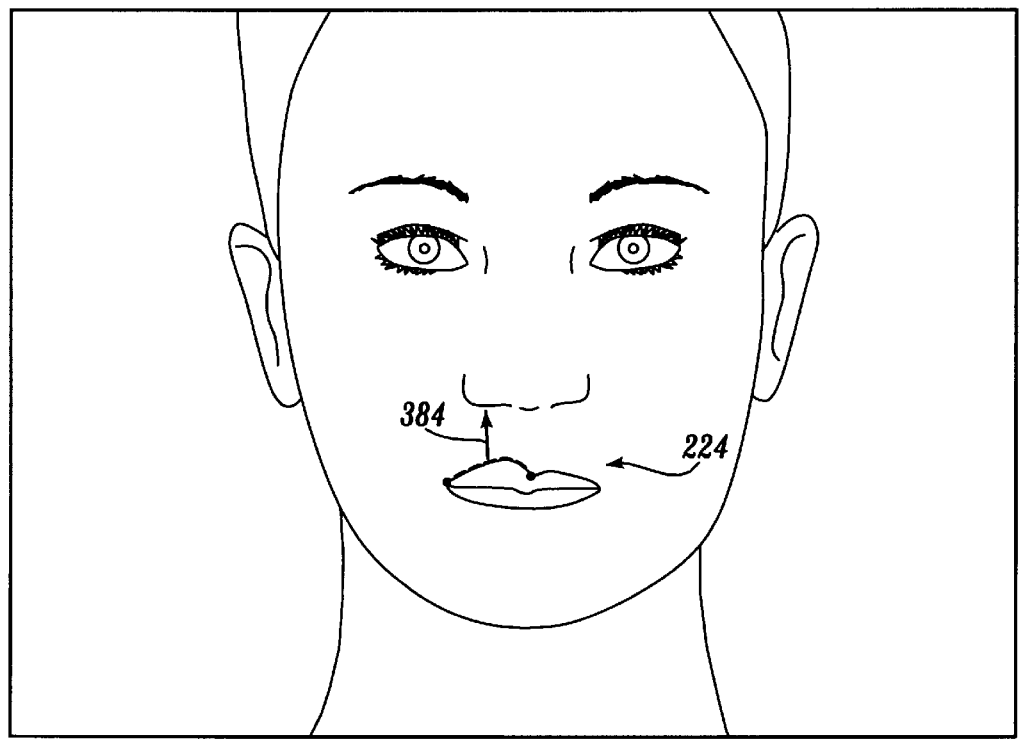

FIG. 9D is a "before" picture without any modifications. To edit the right half of the patient's upper lip, the user first selects the desired end points surrounding the feature to be modified. A first anchor point 374 is designated near the middle of the upper lip, and a second anchor point 376 is designated at the right outer margin of the upper lip. When the anchor points have been selected, a line 378 is displayed between the points by the aesthetic imaging system. By floating the pen over the tablet in a direction generally indicated by arrow 380, the line is bent to form a curve 382 that approximates the contour of the feature being edited. When the user has fitted the curve to the feature, the shape of the curve is set by tipping the pen. As shown in FIG. 9E, the user then selects a point along the portion of the curve by tipping the pen at the desired location. By floating the pen above the tablet, the user can stretch the selected feature in the manner described above. In FIG. 9E, the user floats the pen in a direction generally indicated by arrow 384 to enlarge the patient's right upper lip. As the upper lip is expanded, the pixels forning the upper lip are replicated to expand the portion of the lip, while the pixels outside of the upper lip are deleted.

Figure 9F:
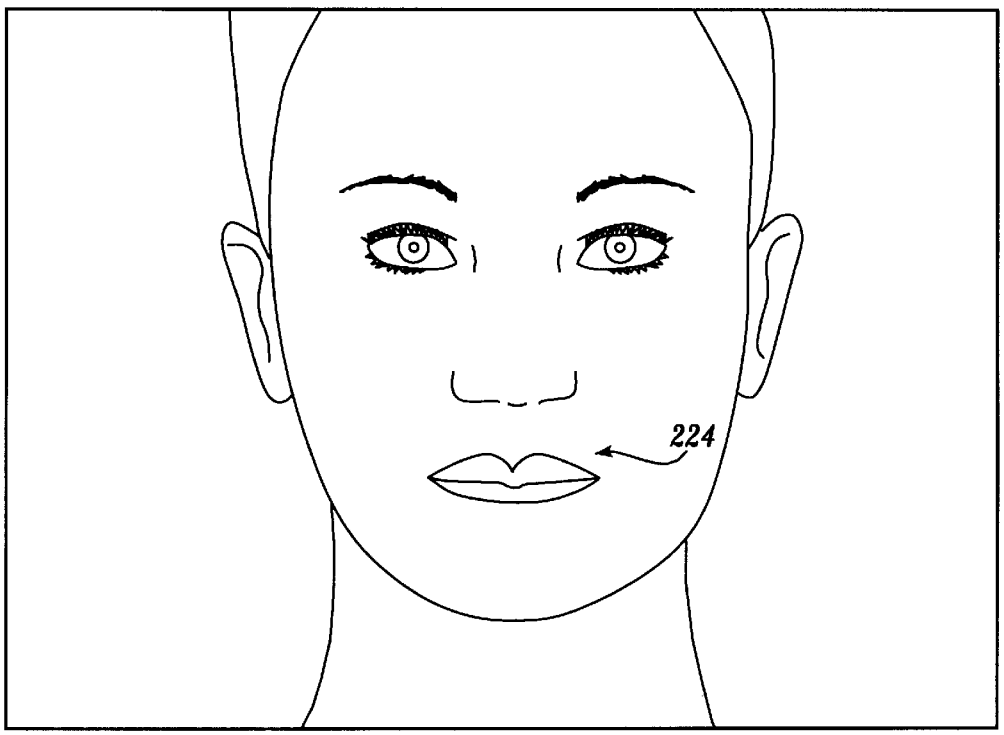
Figure 9G:
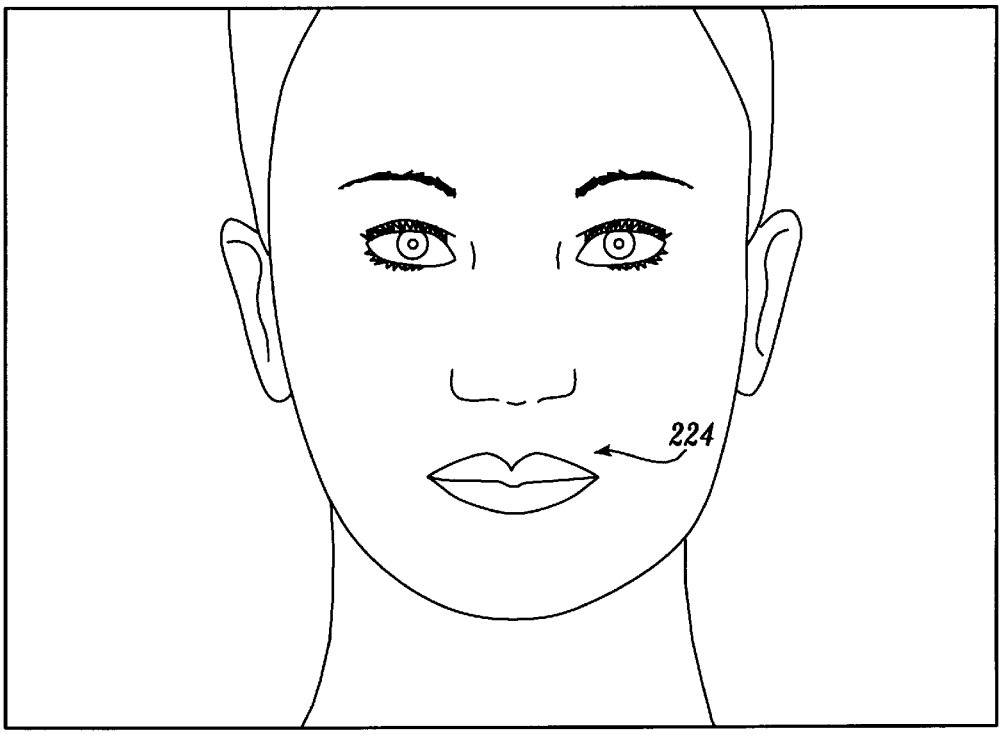

In FIG. 9E, the left side of the person's upper lip has been edited using the contour tool. In FIG. 9F, both the left and right sides of the person's upper lip are shown modified using the contour tool. In FIG. 9G, the lower lip has been edited. Using the contour tool, these edits are accomplished very quickly, in part because the augmented area will automatically match the area around it. The features of the contour tool make it much easier to perform augmentations than is currently available using prior art imaging tools.

Editing Using Shape Tools

FIGS. 10–12B are directed to the shape tool features of the aesthetic imaging system. Similar to the draw tool, the imaging program has a combination feature that is generally available with any of the shape tools. This feature, called the autoblend feature, allows the user to easily move and paste shape tool edits, with or without blending the edges around the edit.

FIG. 10 illustrates an exemplary routine for implementing the autoblend feature of the imaging program. The shape tool group generally includes: Warp, Stretch, Copy, Cutout, Rotate, Freeze Compare, and Resize. The routine of FIG. 10 is invoked after a shape tool has been selected at block 80 of FIG. 3. The side bar menu for the selected shape tool is displayed at block 230. Exemplary side bar menus for various shape tools are set forth below. The side bar menus are illustrated in an effort to further detail options available for a given tool, and may be especially helpful for those unfamiliar with imaging packages.

| Copy, Cutout, Resize | Stretch, Rotate | Freeze Compare |
|---|---|---|
| ● | ● | ● |
| • | • | • |
| • | • | • |
| Zoom | Zoom | Zoom |
| Undo | Undo | Undo |
| Compare | Compare | Split image |
| Split image | Split Image | |
| Inverse | Inverse | |
| Blend | Blend | |

The black dots are brush size options that allow a user to choose the thickness of a shaping tool. The zoom option allows a user to look at an image in greater detail. When the zoom option is invoked, the aesthetic imaging system displays a square overlaid on the image. The square can be positioned by the user with the pen. After positioning the square, that area of the image will be magnified when the pen is selected. Canceling with the pen will display normal viewing mode. The undo option allows a user to undo edits to an image. The compare option allows a user to transition between before and after images. The split image option allows a user view before and after images side by side. The inverse option creates the mirror image of all or only a portion of an image that has been designated by the user. The blend tool will blend edits with the surrounding area. Many of the options shown are also implemented as separate tools under View in the main menu. These are described in greater detail below.

It is noted that the side bar menus available for the drawing tools are similar to the shape tool side bar menus shown. They do, however, typically include an option wherein the user may choose the intensity or opacity of a color used in conjunction with a draw tool.

At block 232, the user is prompted to designate an area of the image to be edited. In a preferred embodiment, this is accomplished by pressing down on the pen and freehand drawing an area, e.g., a circle, that is to be subject to the edit. In this regard, the imaging program contains a unique feature wherein if a partial area is designated and the pen subsequently released, the drawing area will automatically be formed into a contiguous area by the imaging program. At block 236, a test is made to determine if an area has been designated by the user. If not, the routine loops back to block 234 and awaits a designation.

Figures 12A, 12B:
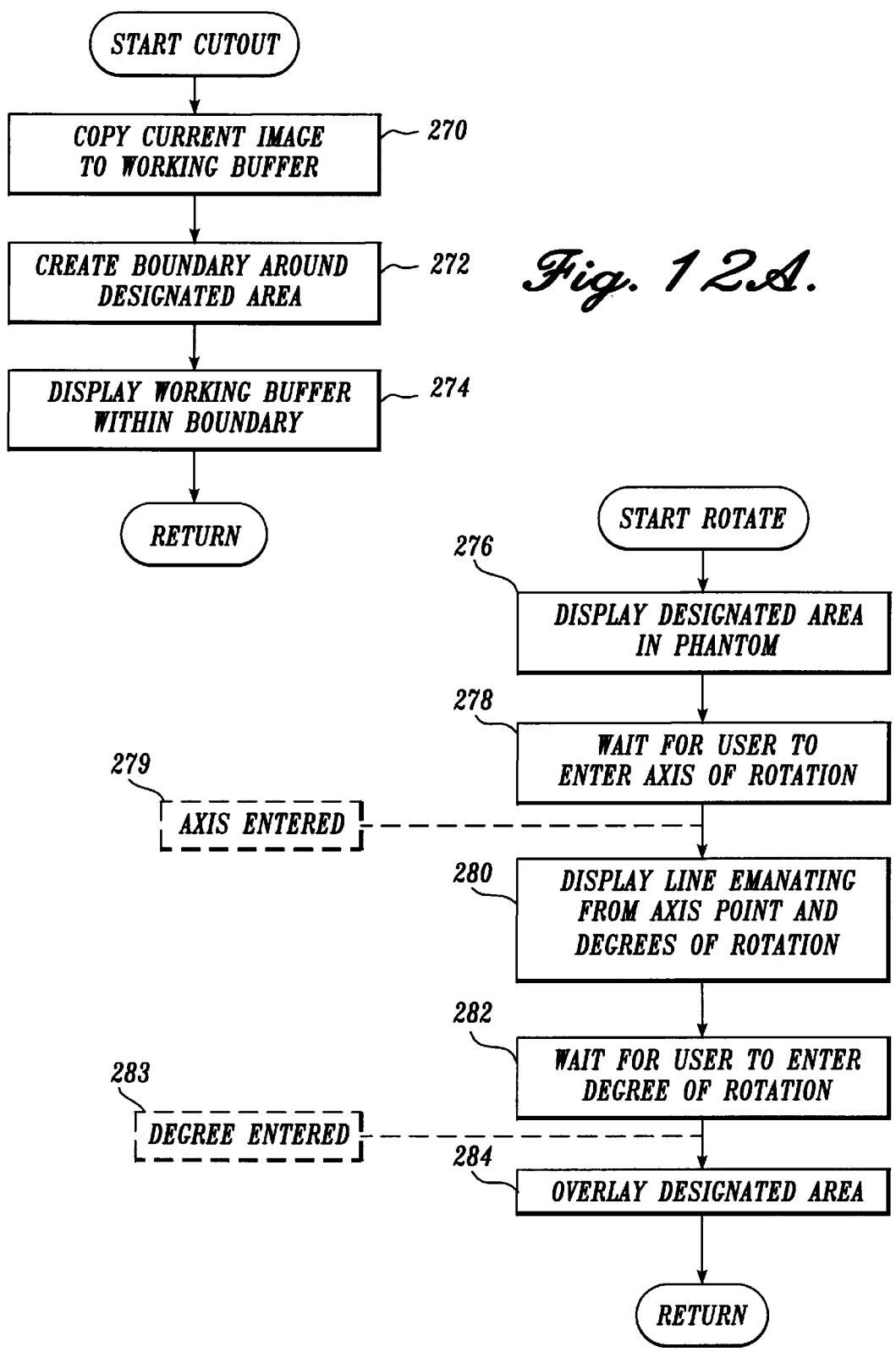
FIG. 12A is a flow chart of an exemplary routine illustrating a cutout tool in accordance with the invention.
FIG. 12B is a flow diagram of an exemplary routine illustrating a rotate tool in accordance with the invention.

After an area has been designated, any edits to the designated area of the image are performed in accordance with the selected shape tool, as indicated at block 236. Two exemplary shape tools for editing an image are illustrated in FIGS. 12A and 12B. At block 238, a test is made to determine if editing of the designated area is complete. In one embodiment, this involves testing for when the user "selects" with the pen anywhere on the tablet. The routine remains at block 238 until editing is complete (or the user exits using the side button). Upon completion of the edits, an autoblend box is displayed in the vicinity of the edited area, as indicated at block 240.

At block 242 a test is made to determine if the tip of the pen has been pressed against the tablet. If not, the routine loops, testing for this occurrence (or an exit command from the user). After the pen tip has been pressed, the imaging program calculates the location of the pen relative to the autoblend box.

Figure 11:
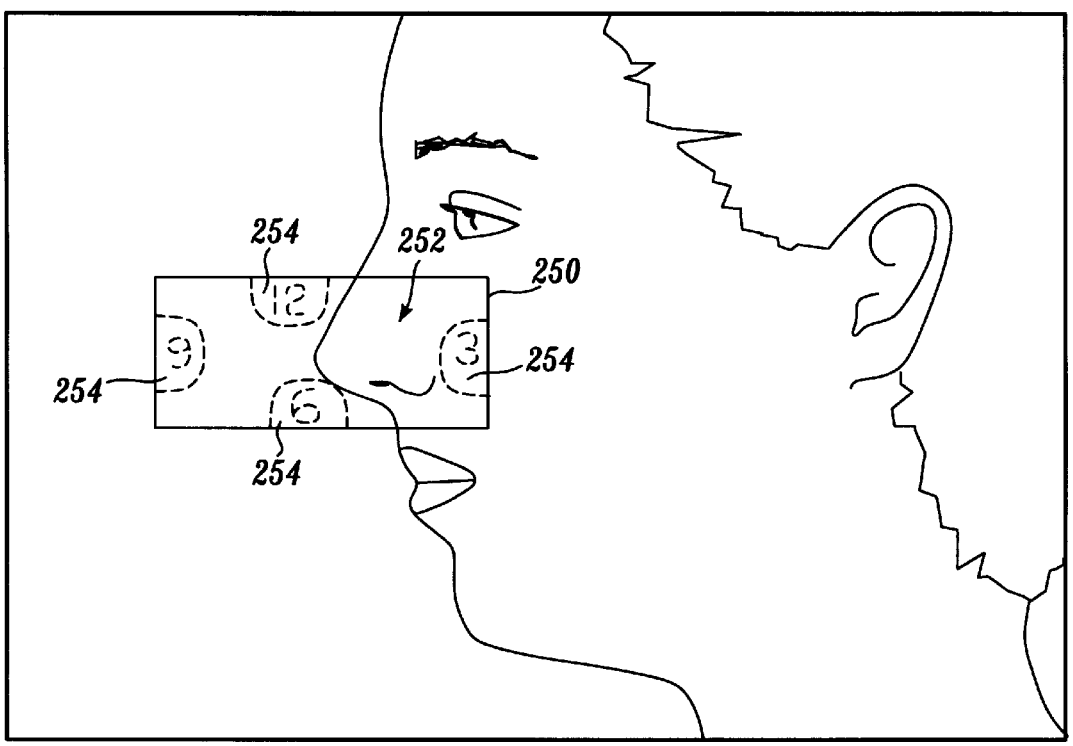
FIG. 11 is a pictorial representation of a user interface for implementing the autoblend tool of FIG. 10.

FIG. 11 illustrates an example of an autoblend box 250 that may be drawn by the aesthetic imaging system in accordance with the invention. As is discussed above, the autoblend box 250 may be used to: (1) move an edited area, (2) paste the edited area onto the image while blending the edge created between the edited area and the rest of the image, and (3) paste the edited image without blending. While the autoblend box 250 uses the conventions set forth below, those skilled in the art will appreciate that other conventions may be used without departing from the scope of the invention.

To move an edited area, the user must press down on the pen anywhere inside the autoblend box, except not at the three-, six-, nine-, and twelve-o'clock positions of the box. The "move" area is designated with reference numeral 254. To paste the edited area without blending, the user must press within the outlined areas 254 at the three-, six-, nine-, and twelve-o'clock positions inside the box. Selecting anywhere outside the box, i.e., area 256, results in the edited area being pasted with blending.

With reference again to FIG. 10, a test is made at block 244 to determine if the pen tip has been pressed at a location outside of the autoblend box. If the pen tip was pressed at a location outside the autoblend box, the edit area is pasted with a blending of the edges at block 260. Otherwise, a test is made at block 262 to determine if the tip location was within the approximate three-, six-, nine-, and twelve-o'clock areas of the autoblend box. A pressing of the tip within any of these areas results in the edited area being pasted without blending, as indicated at block 264. As indicated at block 266, a selection in a location in the autoblend box apart from the three-, six-, nine-, and twelve-o'clock areas will allow the image to be moved. In this case, the edited area will track movement of the pen as long as the tip remains pressed, After a move is completed, the routine loops to block 242.

If a paste has been accomplished using blocks 260 or 264, a test is made at block 268 to determine if the user wishes to exit the shape routine, e.g., by pressing the side button. If not, the routine loops to block 232 where a new area of the image may be considered. Otherwise, the routine returns to block 82 of FIG. 3.

FIGS. 12A and 12B illustrate two exemplary shape tools that are available when using the aesthetic imaging system.

With reference to FIG. 12A, a cutout tool is unique in that a user can select an area of the image to be cut out, thereby creating a "hole" in the image, and an identical image underneath the cutout image can then be moved in all directions as it is viewed through the hole. The cutout feature is especially useful for profile views including chin augmentation, brow lifts, and maxillary and mandibular movement; and frontal views, including otoplasty, brow lift, lip augmentation, nasal base narrowing, and maxillary and mandibular movement.

At block 270, the current image is copied to a working buffer. As is discussed in FIG. 10, when the cutout subroutine is called the user has defined an area of the image to be edited. At block 272, a boundary is created around the designated area designated in block 234 of FIG. 10. At block 274, the working area is displayed inside the boundary, and the current image displayed outside the boundary. In this manner, the image in the working buffer can be moved relative to the image in the current buffer until the desired alignment has been achieved. The program then returns to the routine of FIG. 10.

Upon returning to block 238, the edit may be frozen by selecting with the pen. Thereafter, the autoblend box is displayed. Selecting within the area 252 of the autoblend box allows the designated area to be moved. Selecting anywhere outside the autoblend box will make the edit permanent, with automatic blending. Selecting within the box at the three-, six-, nine- or twelve-o'clock positions (areas 254) will make the edit permanent, without blending.

With reference to FIG. 12B, a rotate tool in accordance with the invention is particularly useful when editing profile views including the nasal tip, mandible, maxilla and brow areas; and frontal views including nares, brows, and the corners of the mouth. As is discussed in FIG. 10, when the rotate routine is called, the user has defined an area of the image to be edited. At block 276, the area designated in block 234 of FIG. 10 is shown in phantom. At block 278, the imaging program waits for the user to enter an axis of rotation. An axis is then entered by the user, as indicated at block 279.

Once an axis of rotation is entered, a display line emanating from the axis point is displayed on the monitor, as indicated at block 280. Also, the number of degrees of rotation is displayed. The position of the pen dictates the degree of rotation. As the pen is moved away from the axis point, the display line will lengthen, providing the user greater control of the rotation of the designated area. At block 282, the system waits for the user to enter a desired degree of rotation. The degree of rotation is entered by the user by selecting with the pen, as indicated at block 283. Once the degree of rotation is entered, the designated area is redrawn onto the current image, as indicated at block 284.

After the redraw, the routine returns to FIG. 10. Upon returning, the autoblend box is displayed. Selecting within the autoblend box allows the designated area to be moved. Selecting anywhere outside the autoblend box will make the edit permanent, with automatic blending. Selecting within the box at the three-, six-, nine-, and twelve-o'clock positions will make the edit permanent without blending.

While prior art imaging programs have a rotate feature, they do not allow a user to select the axis of rotation. The ability to select the axis is valuable in the procedures listed above.

FIGS. 18A–18D disclose the capabilities of the warp shape tool in the aesthetic imaging system. The warp shape tool is a powerful tool that allows users to easily edit a patient's features. Similar to the contour tool, the warp tool allows a user to select and manipulate a feature of the patient's image, with the aesthetic imaging system automatically redrawing the area surrounding the manipulated feature as the manipulation is being performed.

Figure 18A:
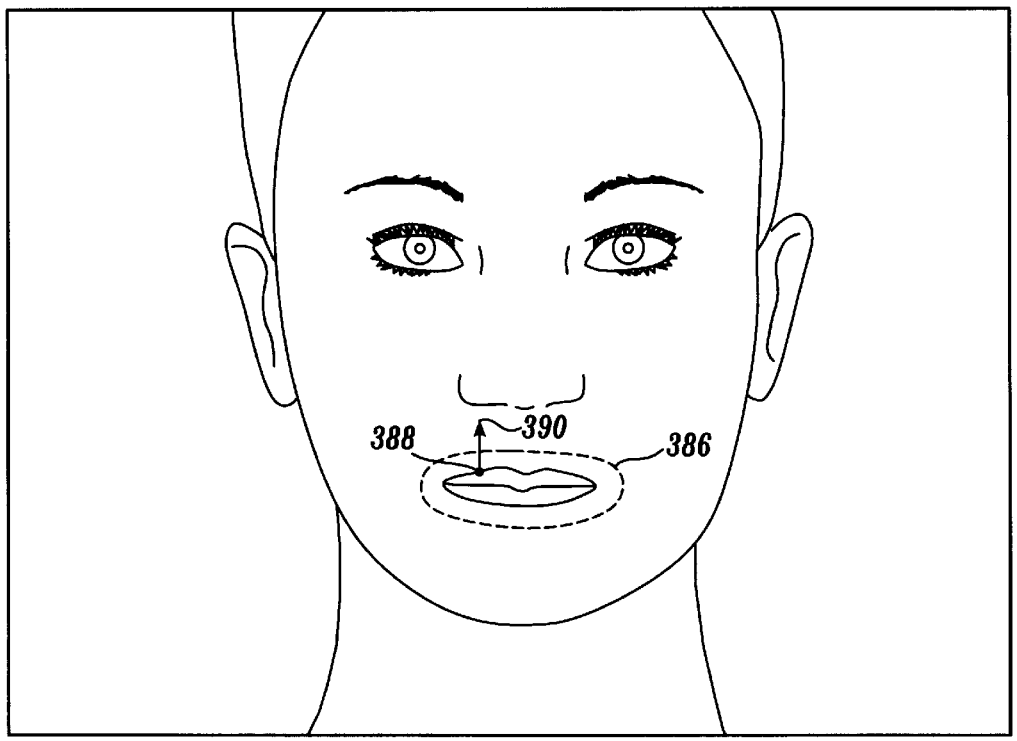
FIGS. 18A–18C are pictorial representations illustrating the use of a warp shape tool to edit a patient's image

As shown in FIG. 18A, the user first defines an image to be manipulated by the warp tool by encircling the portion of the image to be edited as shown by dotted line 386. Once the area has been selected, a user may tip the pen to designate a stretch point within the selected area. As shown in FIG. 18A, a stretch point 388 has been designated near the top portion of the patient's right upper lip. Once the stretch point has been designated, the user may float the pen in the desired direction that they would like to stretch the image. The portion of the image that is located at the stretch point is pulled in the direction that the user floats the pen, with the area surrounding the stretch point either expanded or compressed. That is, the area in the direction that the user floats the pen is compressed, and the area away from the direction that the user floats the pen is expanded. The amount of expansion or compression is dictated by the distance of the area away from the stretch point, in a manner discussed in greater detail below. Preferably, the image is manipulated in real time, so that the user is presented with a seamless and continuous stretching or movement of the selected feature.

The technique used to implement the warp tool is portrayed in FIGS. 19A–19E. A user first defines a manipulation area 420 to be edited by circling the desired feature of the patient. As shown in enlarged detail in FIG. 19B, when the manipulation area has been selected, the aesthetic imaging system creates a pixel map of a warping area 422 that completely encompasses the manipulation area. For computational purposes, the warping area is preferably rectangular and approximately 33% larger in area that the manipulation area. It will be appreciated, however, that the warping area may be differently shaped or sized depending on the particular application and available system hardware.

Figure 19A:
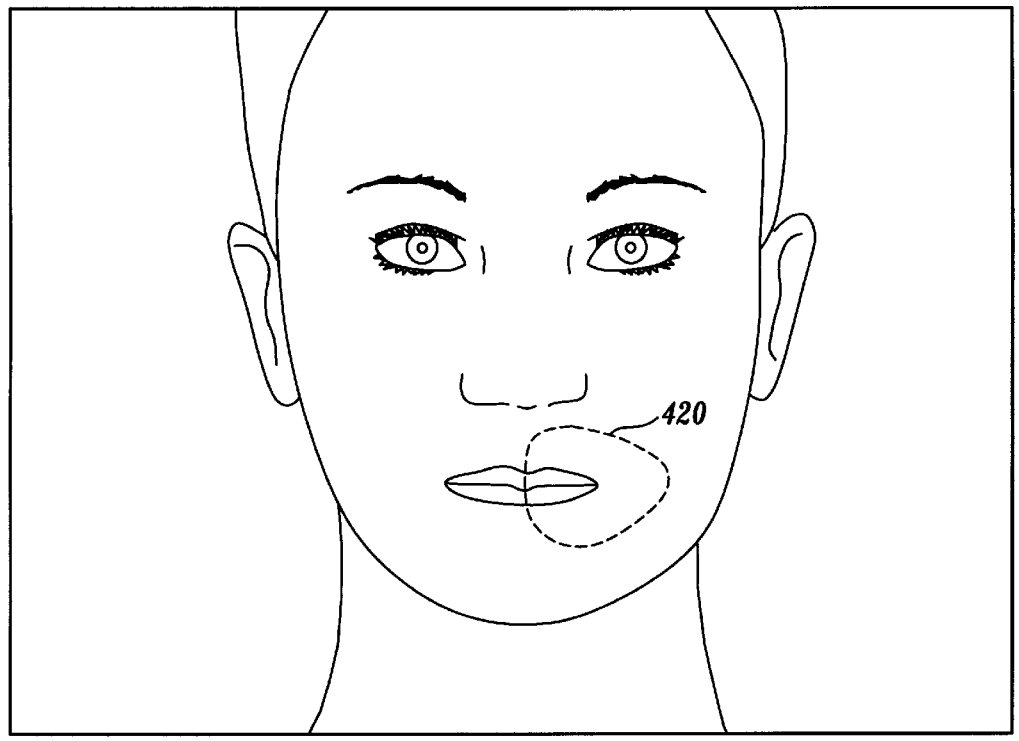
FIGS. 19A–19E are pictorial representations illustrating the function of the warp tool.
Figure 19B:
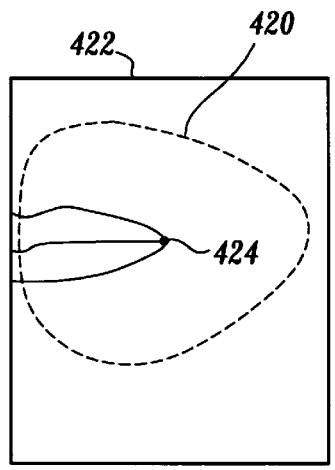
Figure 19C:
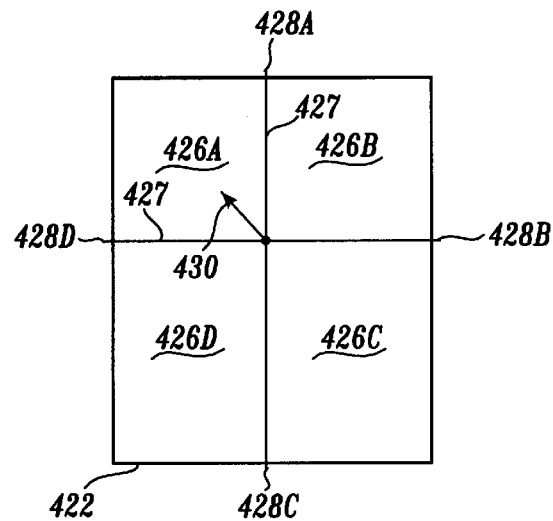

After defining the manipulation area, the user selects a stretch point 424 within the manipulation area by tipping the pen at a desired location within the area. As shown in FIG. 19C, when the stretch point is selected, the aesthetic imaging system maps four rectangles 426a, 426b, 426c, and 426d in the warping area. One corner of each rectangle is defined by the stretch point, and the diagonally opposing corner is defined by a corner of the warping area. Perpendicular lines 427 drawn through the stretch point intersect the warping area boundary at points 428a, 428b, 428c, and 428d. After the stretch point is selected, the user may float their pen to manipulate the selected feature, for example in the general direction indicated by arrow 430.

Figure 19D:
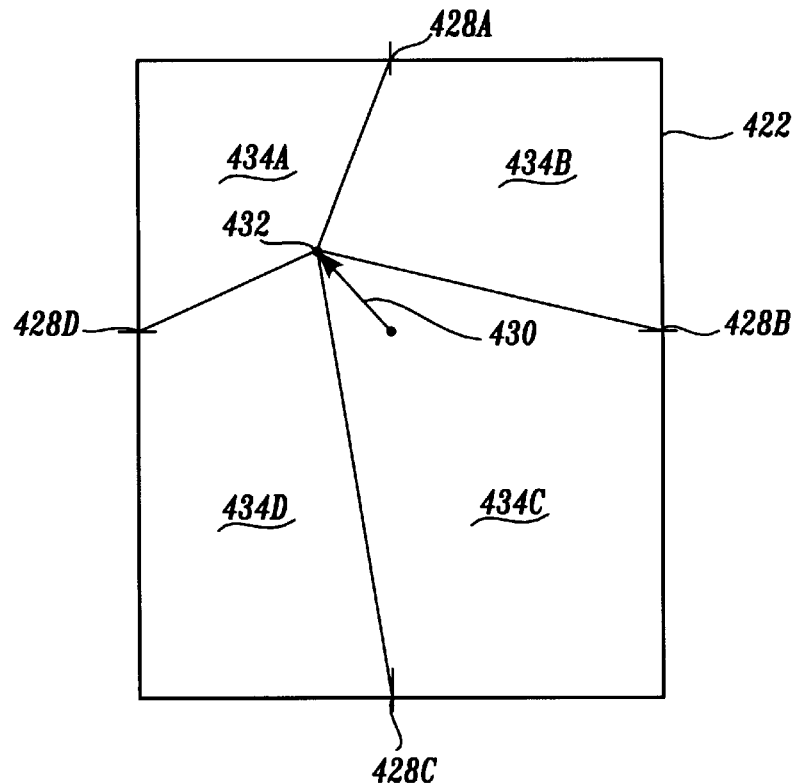

As the user floats the pen to warp the selected feature, the rectangles in the warping area are distorted. In FIG. 19D, the stretch point has been moved upwards and to the left in the warping area, to an intermediate location 432. Periodically during the stretch point's motion, the aesthetic imaging system determines the shape of four quadrilaterals 434a, 434b, 434c, and 434d, with sides that extend from the intermediate location 432 of the stretch point to original points 428a, 428b, 428c, and 428d. Using a bilateral transformation, the pixels in the original rectangles 426a, 426b, 426c, and 426d are then mapped into the quadrilaterals. Further movement of the stretch point repeats the process, the original set of rectangles being mapped into the new quadrilaterals that are generated by the movement. If the display is updated frequently as the stretch point is moved, the user views the mapping and remapping as a warping of the patient's feature within the manipulation area. It will be appreciated that only the portion of the warping area that coincides with the manipulation area is presented to the user. The pixels comprising the remaining portion of the warping area are used for computational purposes, but are not displayed to the user.

Figure 19E:
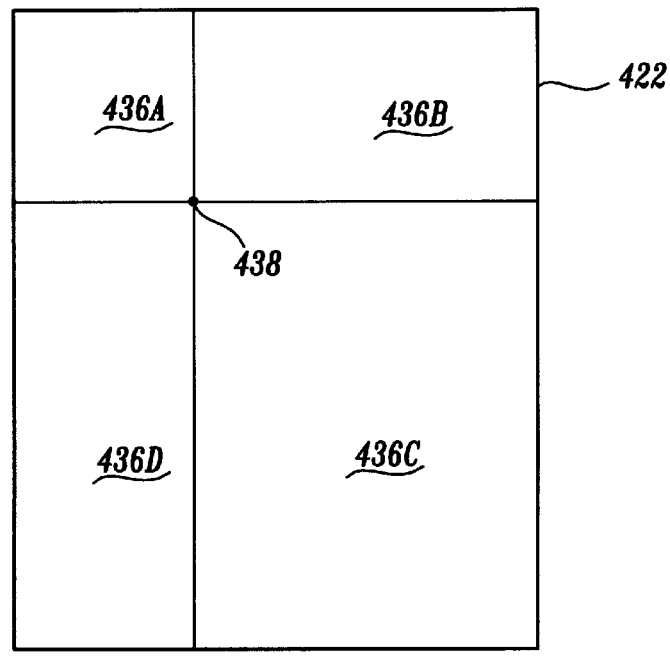

When the desired warping effect is achieved, the user tips the pen to fix the stretch point in a desired location. To ensure there is no discontinuity between the manipulation area and the surrounding area of the patient's image, automatic blending around the outer margins of the manipulation area is performed by the aesthetic imaging system. As shown in FIG. 19E, the aesthetic imaging system also remaps the warping area, creating four new rectangles 436a, 436b, 436c, and 436d based on the ending location 438 of the stretch point. In a preferred embodiment of the invention, a second stretch point may then be selected within the manipulation area and the process repeated, with the second warping transforming rectangles 436a, 436b, 436c, and 436d that resulted from the first warp. After the second warping is completed, the user may then select a third or additional warp point to further manipulate the image. Each manipulation is performed without the user having to redefine the manipulation area.

Figure 18B:
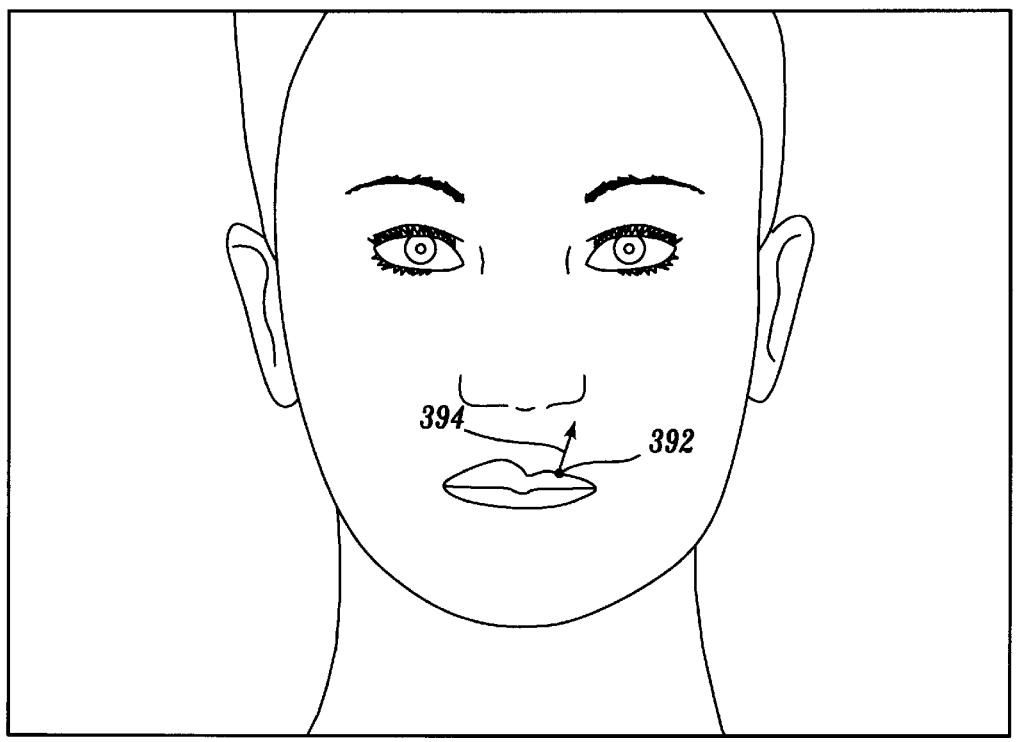
Figure 18C:
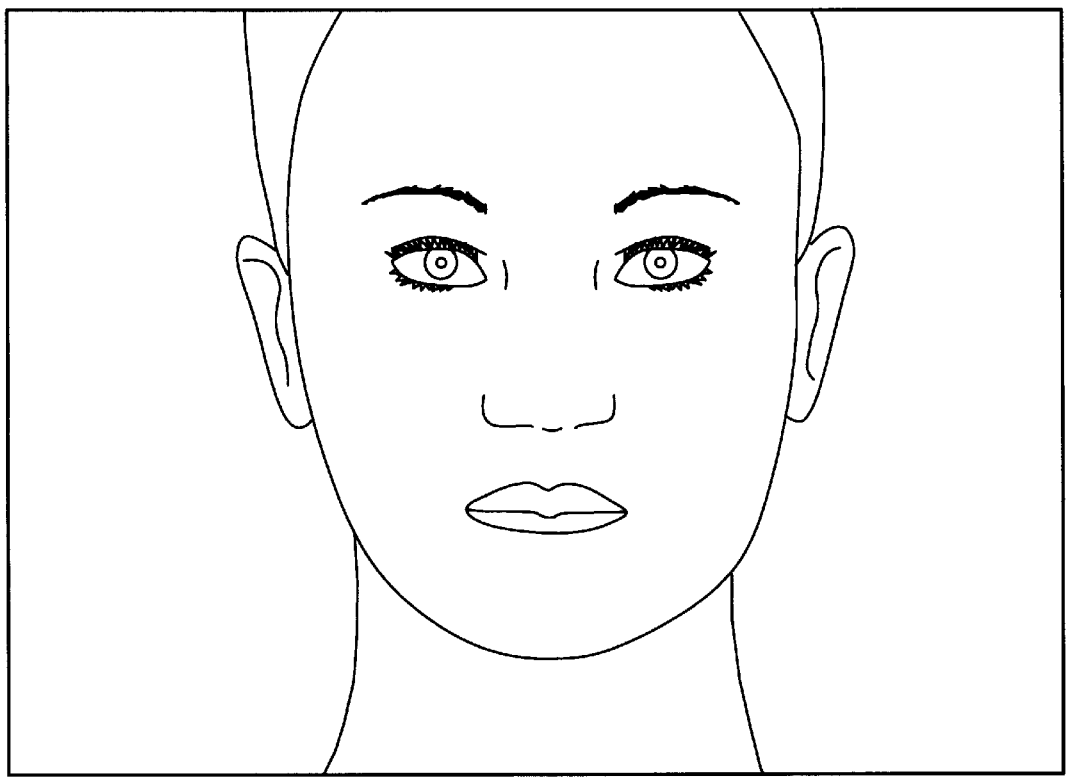

The flexibility and power of allowing multiple warps on a selected region is demonstrated in FIGS. 18A–18C. Returning to FIG. 18A, a user designates a stretch point 388 and floats the pen in a direction generally indicated by arrow 390. Floating the pen upwards and outwards generally causes the upper right portion of the lip to be expanded in that direction. The resulting manipulation is shown in FIG. 18B, wherein the right lip has been made fuller. The area surrounding the lip is expanded or compressed to ensure that there are no discontinuities between the edited lip and the surrounding face. In FIG. 18B, the user selects a second stretch point within the manipulation area to further stretch the selected feature. For example, a stretch point 392 may be positioned on the upper portion of the left lip, and the pen floated in a direction generally designated by the arrow 394. As shown in FIG. 18C, this generally causes the upper left portion of the lip to be made fuller to match the upper right portion of the lip. Again, during the warping the aesthetic imaging system automatically expands or contracts the surrounding unmanipulated area to ensure that there are no discontinuities between the upper left and the unedited portion of the face.

The warp tool with multiple stretch points is a very powerful tool as it allows the user to quickly manipulate an image with a minimum use of drawing tools or piecemeal editing. Because the warp tool performs the manipulation in real-time, the edits are accomplished very quickly and fluidly. A user may therefore generate a desired image in a minimal amount of time.

Viewing an Image

FIG. 13 illustrates an exemplary routine for implementing the view features of the imaging program. In FIG. 13, the solid blocks indicate user interface options presented to the user by the aesthetic imaging system and the dashed blocks represent system responses to the decisions made. The view group includes: Compare, Prioritize, Split Image, Mirror Image, and Restore to Original, as well as other options including Zoom and Emboss. At block 300, a test is made to determine if the Compare option has been selected.

The Compare option allows a modified image to be compared to the original image so that a viewer can more readily see the changes. Specifically, as the pen is floated from the top to the bottom of the tablet, the user will see one image transition or "morph" into the other. The morphing is accomplished by overlaying the original image with the modified image, and varying the opacity of the modified image. When the modified image is opaque, only the modified image may be viewed by a user. When the modified image is completely transparent, only the original image may be viewed by a user. In between these two extremes, varying amounts of the edits made to the image will be apparent to the user. The feedback to the patient as the original image morphs into the modified image is much more powerful than a side-by-side comparison of the two images.

When a desired comparison level is achieved, a user can press the tip of the pen to freeze an image displayed on the monitor at a point anywhere from zero to 100% of the transition from the original to the modified image. Freezing an image at a partial transition is extremely helpful where edits have been performed on an image that are not realistically achievable in surgery, but an achievable result lies somewhere between the original and the modified image. For example, it is easy to edit a blemish on a face so that area resembles the surrounding skin and thus becomes invisible. However, the total removal of the blemish may not be realistic. In this case, a transition of that area toward the original image will slowly "fade in" the blemish. A physician may then freeze the fading process at a desired point to provide a realistic image of what surgery can achieve to the patient.

Figure 14A:
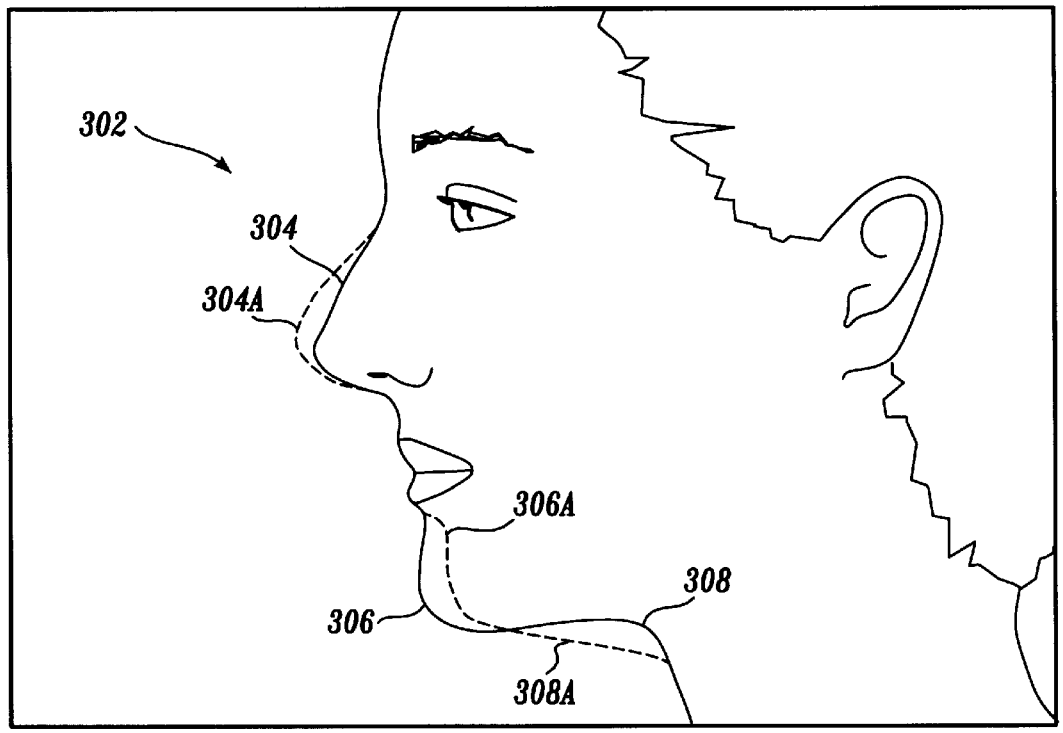
FIGS. 14A–14D are pictorial representations illustrating the effects of a compare feature in accordance with the invention.

Another option that is a subset of the Compare option is the Prioritize option. The Prioritize option allows a user to designate areas that have been edited so that the user can selectively illustrate the effects of two or more procedures that have been shown to a patient. For example, FIG. 14A illustrates a modified profile image 302 of a patient that includes a rhinoplasty procedure (nose) 304, a chin augmentation procedure 306 and a submental lipectomy procedure (neck) 308. The boundaries that have been edited are illustrated by dashed lines 304a, 306a, and 308a, corresponding to the patients original nose profile, chin, and neck, respectively. Using the Prioritize option, the user can designate one area on the modified image, and illustrate transitions between the original and modified images at that area only by floating the pen. Any areas not selected will continue to be displayed as the original image.

With reference again to FIG. 13, if the Compare option has been selected, a test is made at block 309 to determine if the entire image is to be compared or only certain portions of the image, i.e., using the Prioritize option. If less than the entire image is to be compared, the user is prompted to enter the area or areas that are to be compared at block 310. A user may then define one or more "priority areas" by freehand circling the desired area. When the priority areas or defined, or if all of the edits are to be reviewed during the comparison, at block 311 the user is prompted to float the pen in a vertical motion on top of the tablet to transition between the original and modified images, in accordance with the Compare feature discussed above. An illustration will clarify this point.

Figure 14B:
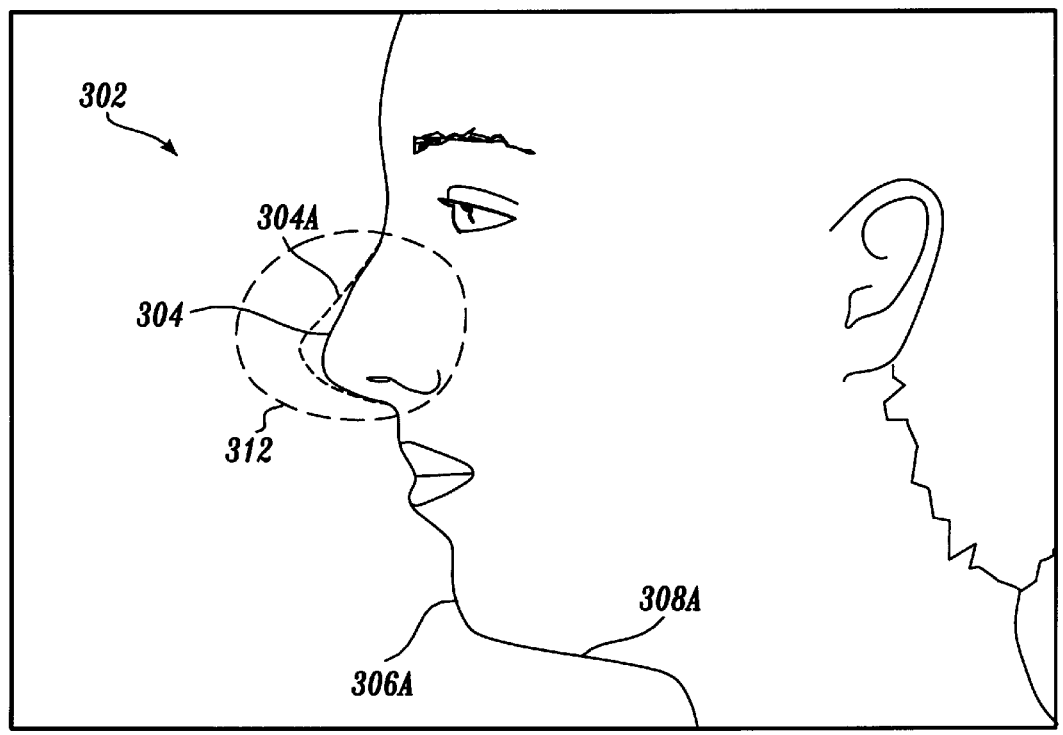
Figure 14C:
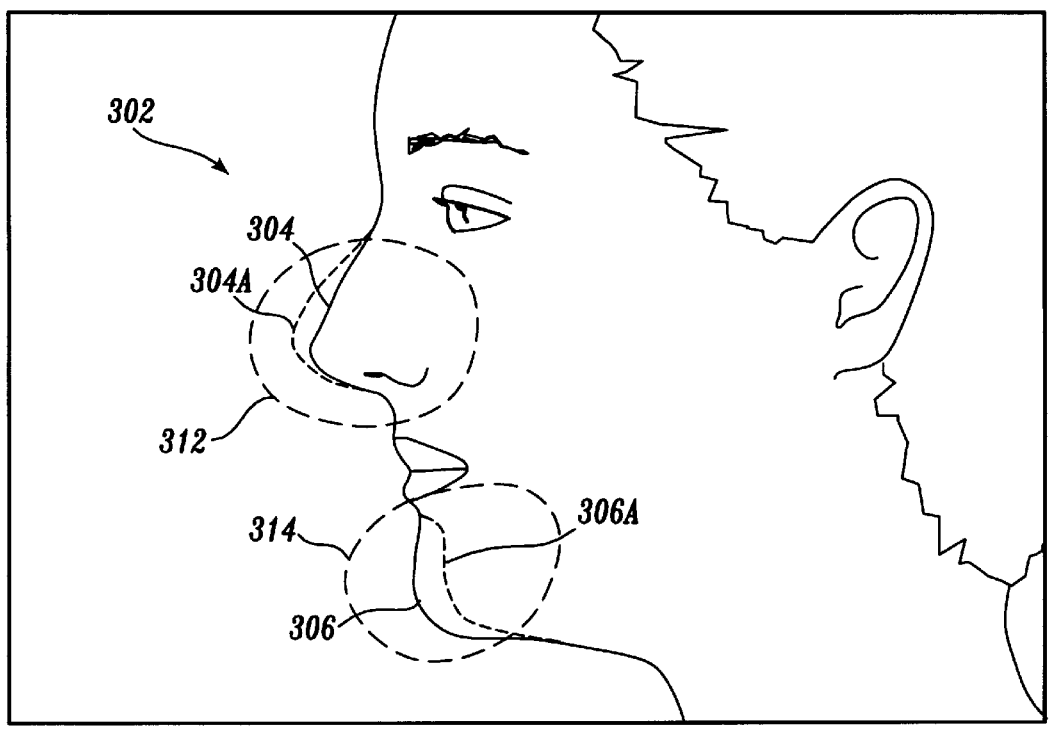

In FIG. 14B, a first priority area 312 has been defined that corresponds generally to the nose. Given this selection, the nose area only will transition from original to modified as the pen is moved, with the rest of the image being displayed unedited. Thus, the modifications to the chin and neck no longer are shown. In FIG. 14C, a second priority area 314 has been defined that corresponds generally to the chin. The first priority area 312 has been kept. Given these selections, the nose and chin areas only will transition from original to modified as the pen is moved, with the rest of the image being displayed unedited. Thus, the modifications to the neck are not illustrated.

Figure 14D:
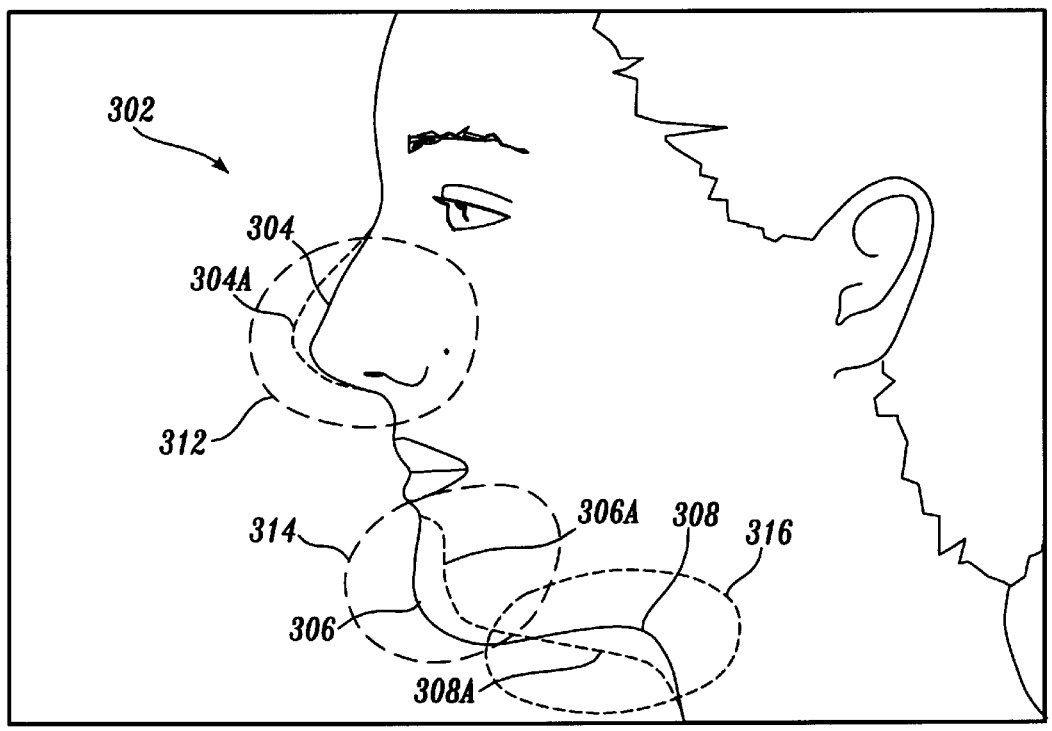

With reference to FIG. 14D, a third priority area 316 has been defined that corresponds generally to the neck, along with the former designations. Given these selections, all three priority areas 312, 314, and 316 transition with movement of the pen. Again, the undesignated portions of the image are displayed in an unedited form, even if parts of the image outside the priority areas have been edited (no edits are shown). Because edits have not been made, from a user's standpoint the transition in FIG. 14D appears to be a comparison between the original and modified images.

While preferably the user defines the priority areas on the image being edited, it will be appreciated that the priority areas may also be automatically defined by the aesthetic imaging system. A comparison may be made between an original image stored in a buffer and the edited image that has been modified by the user. Any areas containing differences between the original and the edited image may be highlighted by the aesthetic imaging system, and a priority area automatically defined for each area containing differences. Whether a priority area is defined may also depend on the number of differences between the original image and the edited image.

In an alternative embodiment of the invention, when a user defines one of the priority areas in the Prioritize option, the user is prompted to enter a textual identifier for the defined area. For example, after circling the area in FIG. 14B and defining a first priority area 312, the user would be prompted to enter a textual identifier corresponding to the first priority area. The user may assign a descriptive identifier related to that priority area, such as "nose", or the user may assign a non-related textual identifier such as "areal". Textual identifiers assigned by the user in this manner are displayed to the user in a submenu of the Prioritize option. The user may then select from the submenu of the Prioritize option those areas that they wish to display from the list presented to them. For example, the prioritize submenu corresponding to FIG. 14D may present the user with a choice of "nose," "chin," and "neck." By selecting the nose and neck from the prioritize submenu, the user could simultaneously display only the effects of the nose and neck procedures. After making such a comparison, the user could deselect neck from the prioritize submenu, and instead select the chin and nose. This would allow the user to display only the effects of the chin and nose procedures using the compare option. It will be appreciated that assigning textual identifiers to each of the defined priority areas provides greater flexibility to a user, since the user does not have to redefine each of the priority areas that are to be displayed each time. A user may therefore quickly cycle through various permutations of the procedures that have been edited for patient display.

In the alternative embodiment in which textual identifiers are assigned to each of the priority areas, it will be appreciated that various methods can be used to display to the user the correspondence between the textual identifier and the priority area. For example, when the user selects one of the textual identifiers, the priority area could be highlighted or otherwise encircled with a contrasting color to indicate to the user the area of the image that corresponds to that textual identifier. Similarly, a user may also point to specific areas of the displayed image and have the textual identifier corresponding to that area appear to the user. Displaying the correspondence between priority area and identifier would allow a user to rapidly determine the available priority areas that may be shown to a patient when the user has not recently worked with or otherwise viewed the image.

With reference again to FIG. 13, at block 320 a test is made to determine if the user wishes to save a transitional or morphed view of an image. If a transitional view is to be saved, the user may establish the percentage transition, i.e., anywhere from zero to 100 percent transition (zero percent being the original image and 100 percent being the edited image), by floating the pen up or down above the tablet to establish the view, and the pressing the tip of the pen against the tablet to freeze the transitional image, as indicated in block 322. If the tip is pressed again, the frozen image is saved. The save options are available with or without the priority areas in effect. After the save has been accomplished, or if the user did not wish to save a transitional view of an image, the Compare option is complete and the routine branches to block 326.

In an alternative embodiment of the invention, the Compare option allows a user to compare a modified image with any edits made to the modified image during the current editing session, i.e., before the changes are permanently saved to the modified image. Specifically, with reference to FIG. 2, this embodiment of the Compare option contrasts the image in the current image buffer 54 with the image in the modified image buffer 52. As discussed above, this embodiment of the Compare option may also be used in conjunction with the Prioritize option to allow the user to select priority areas for comparison. In this case, the priority areas transition from the modified to the current image, while the modified image only is displayed in the other (nonselected areas) areas.

Figure 15A:
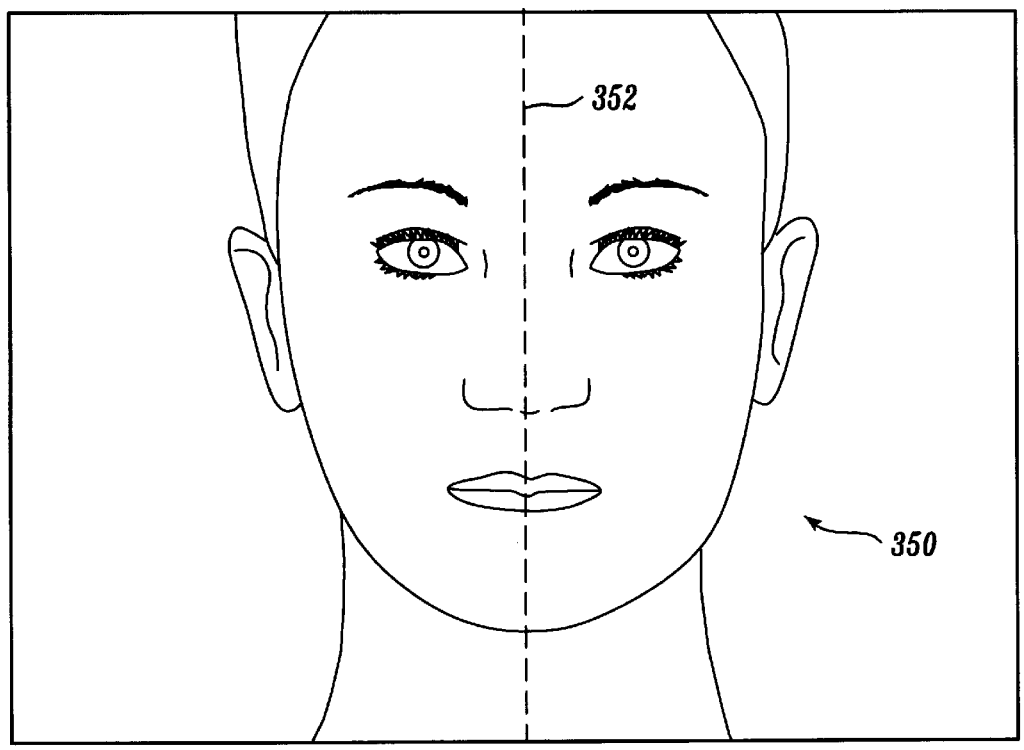
FIGS. 15A–15C illustrate a split image option of viewing images in accordance with the invention.
Figure 15B:
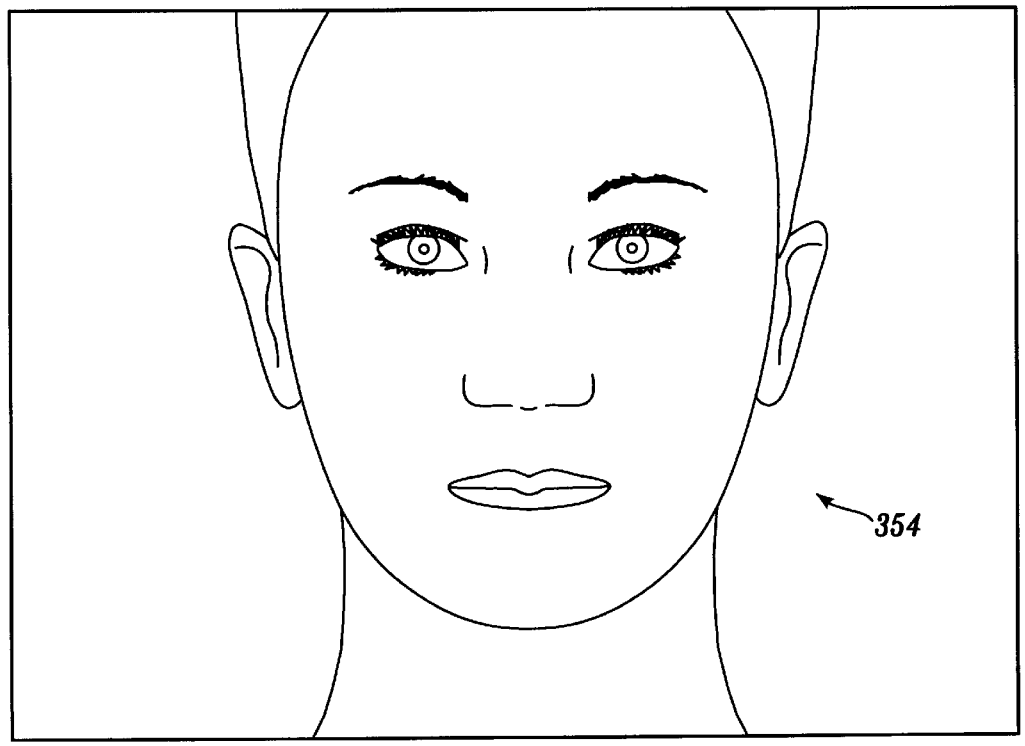
Figure 15C:
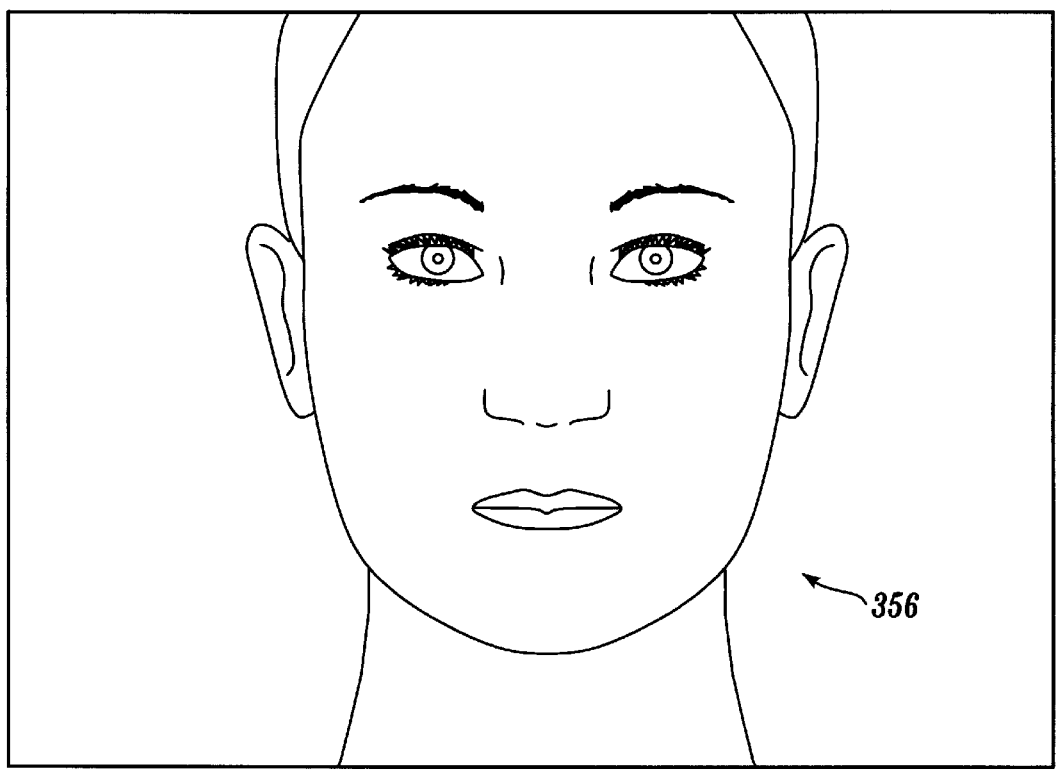

At block 326, a test is made to determine whether the user wishes to view a split image. The Split Image option is used on a frontal picture only, and allows a patient to see his or her asymmetries. If a split image view is desired, the user is prompted to select an image, e.g., original or modified, at block 330. At block 332, a vertical centerline is displayed on top of the selected image. The user is then prompted to position the centerline at the location desired, as indicated at block 334. Typically, the centerline will be positioned to dissect the image into equal halves, using the nose and the eyes as reference points. At block 336, the aesthetic imaging system displays two images, one showing the left halves pieced together and the other the right halves pieced together. Specifically, the aesthetic imaging system will produce an inverse image of the left (right) half and then add it to the left (right) half FIGS. 15A–15C illustrate the resultant images that are displayed when the Split Image option is invoked. In FIG. 15A, a frontal image 350 of a patient is shown, including a centerline 352 that has been positioned at the center of the patient by a user. FIG. 15B is an illustration of the left halves of the image after being pieced together by the aesthetic imaging system, as indicated by reference numeral 354. FIG. 15C is an illustration of the right halves of the image, as indicated by reference numeral 356. With the Split Image option, patients can view what they would look like if their faces were symmetrical. The tool is especially useful in the consultation stage because many people do not realize that the typical face is asymmetrical, and changing a face to be perfectly symmetrical, if possible, is not necessarily desirable.

Once the split images have been displayed, or if the Split Image option was not selected, a test is made at block 360 to determine if the user wishes to view an inverse or mirror image of a picture, e.g., to show patients the view they see of themselves when looking into a mirror. If an inverse image is desired, the user is prompted to select an image to be viewed at block 362. The selected image is then "flipped" using the aesthetic imaging system, and displayed on the monitor, as shown at block 364. After the image has been displayed, or if the inverse image option was not invoked, routine returns to block 86 of FIG. 3.

When viewing an image on the monitor, it is important that a patient remains focused on the image being manipulated rather than on the features of the aesthetic imaging system. When certain viewing options are selected, for example, the prioritize option shown in FIGS. 14A–14D, or the split image option shown in FIGS. 15A–15C, the menu bar normally located across the top of the display is therefore removed. Only the image of the patient is kept on the screen, ensuring that the patient remains focused on the image being manipulated.

Figure 20:
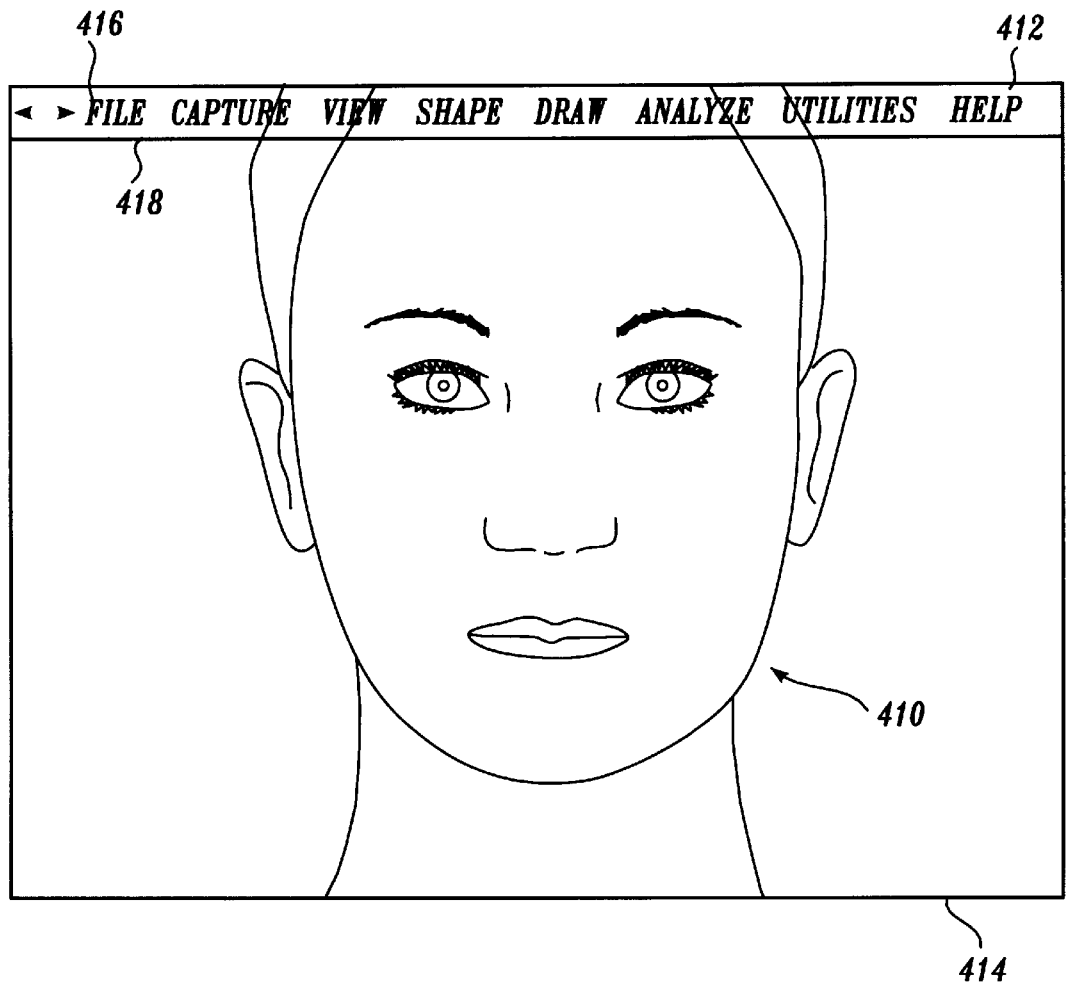
FIG. 20 is a pictorial representation illustrating the use of a transparent menu bar when viewing an image of a patient.

In certain situations where it is necessary to display a menu bar, however, it is advantageous to minimize the visual appearance of the menu bar. FIG. 20 is a representative image 410 of a patient with a menu bar 412 located across the top of the screen 414. To reduce the distraction caused by the menu bar, the menu bar is preferably translucent to allow the user to view the patient's image through the menu bar. The text 416 and the line 418 indicative of the menu bar are preferably presented in a contrasting, yet muted, color to allow the user to read the commands. For example, the text and the line outlining the menu bar may be presented in an off-white. While editing the image with a patient present, the patient is therefore not overly distracted when the menu bar periodically appears at the top of the screen. Even when the menu bar is present for extended periods of time, a patient is not distracted since it does not visually stand-out from the patient's image. At the same time, a skilled user is provided with sufficient information about the menu choices to allow them to choose the appropriate menu options.

To further reduce the distraction caused by the menu bar, preferably the menu bar 412 may be moved by a user to different locations on the screen 414. For example, the menu bar may be moved by a user to the bottom of the screen. Particularly when editing the face of a patient on the screen, the majority of the editing will take place on the upper two-thirds of the screen. Locating the menu bar on the bottom of the screen therefore positions the menu bar away from the area on which the patient should remain focused. It will be appreciated that techniques for moving a menu bar to various locations on a screen are known to those skilled in the art of designing user interfaces.

Figure 21:
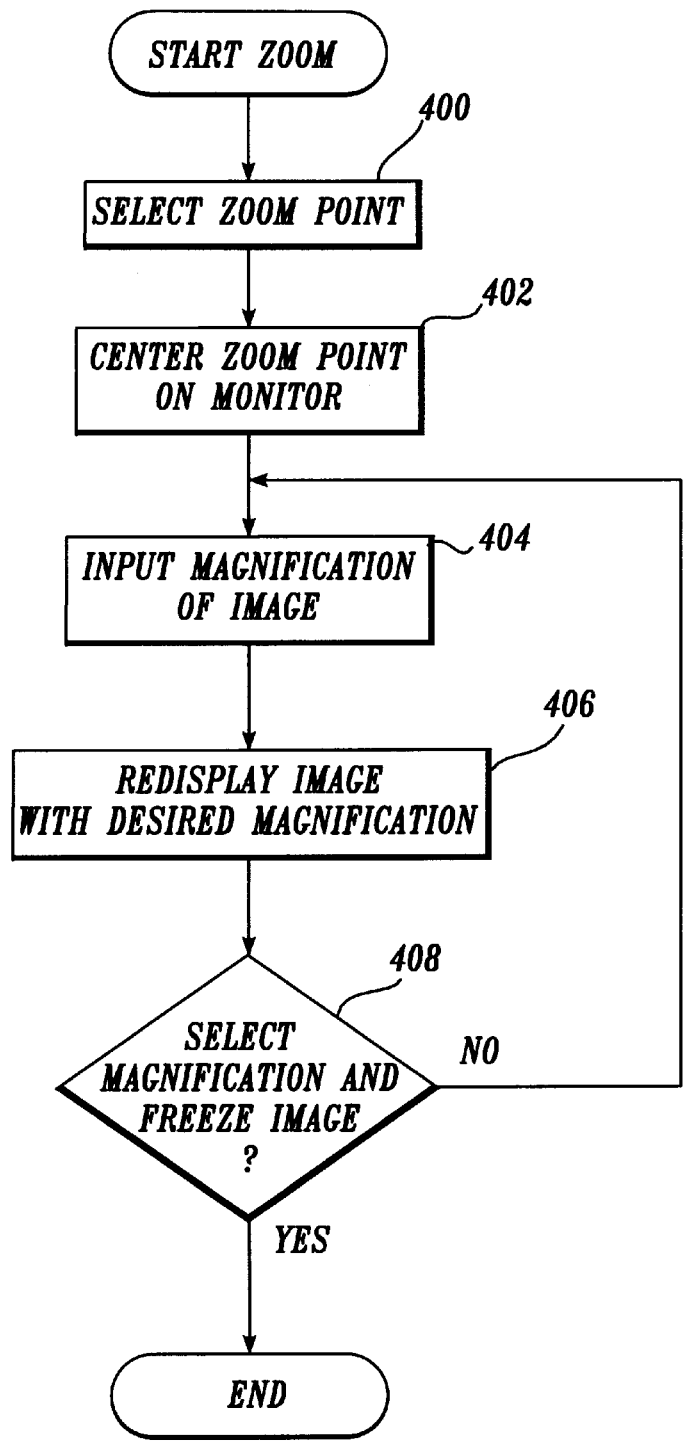
FIG. 21 is a flow chart of an exemplary routine for implementing a zoom viewing feature in accordance with the invention.

FIG. 21 is a flow chart of an exemplary routine for implementing a zoom feature in the aesthetic imaging program. The zoom feature allows a user to increase the scale of the image to better view a selected area and to improve the ability of the user to edit fine details in the image. At a block 400, a zoom point is selected by a user. The zoom point identifies the center of the image to be expanded under the control of the user. At a block 402, the picture is adjusted to position the zoom point at the center of the monitor. Centering the picture ensures that as the image is enlarged, the portion of the image surrounding the zoom point will be displayed. At a block 404, the user is allowed to input a desired magnification factor. Preferably, the magnification factor is selected by floating the pen from the bottom (minimum magnification) to the top (maximum magnification) of the tablet. As the user floats the pen over the tablet, the image on the monitor is correspondingly magnified and redisplayed at a block 406. With each redisplay of the image, at a block 408 a test is made to see if the user has frozen the image by pressing or tipping the pen. Once the image is frozen at a desired magnification, a user can manipulate the image using the array of drawing tools described above. It will be appreciated that for very fine work, such as removing small wrinkles surrounding a patient's eyes, the ability to magnify the image increases the quality of the editing that may be achieved.

Several refinements of the zoom feature may be incorporated in the aesthetic imaging program to improve the results of the zoom. For example, a smoothing function may be incorporated in the zoom feature to ensure that as the image is magnified it does not become "pixelly" or grainy. The smoothing function may be implemented in software. Preferably, however, the smoothing function is implemented in hardware, such as a smoothing feature provided in the Targa 2000 board described above and incorporated in the aesthetic imaging system. Further, feedback may be provided to the user in the form of a numerical display on the image to indicate the approximate magnification as the user floats the pen from the bottom to the top of the tablet. Other means can also be implemented to allow the user to select the desired magnification, including a pull-down menu or numerical entry.

Yet another view option provided to the user in the aesthetic imaging system is an Emboss option. It has been found that the emboss viewing option is very helpful in allowing a user to discern wrinkles or other skin imperfections in a displayed image. By selecting the emboss option, the user causes an image of the patient to be displayed in a gray scale. The emboss option displays an image that is similar to an etching made of a three-dimensional raised surface. A two dimensional image is portrayed, with the depth of the raised surface indicated by a darker shade of gray. The emboss option removes any deceptive information conveyed by the color or shading of the skin of the patient and allows any raised or depressed areas to be clearly highlighted. When viewing wrinkles or other imperfections on a patient, the emboss option therefore clearly identifies the raised or depressed features over the smooth skin of the patient.

Preferably, the emboss option is implemented using a function provided in the Targa 2000 board described above and incorporated in the aesthetic imaging system. The particular function used to manipulate a bitmap contained in the Targa board buffer is:

setResizerToEmboss(cotist BlitListSize &size, int dx, int dy, int scale=0x100) where:

dx and dy =the offset of the emboss operation; and scale =a "pressure" of the emboss.

After selecting the emboss option, the user may manipulate the offset of the emboss by floating the pen over the tablet. Floating the pen parallel to the x-axis of the tablet adjusts the dx parameter in the emboss function, and floating the pen parallel to the y-axis adjusts the dy parameter in the emboss function. It has been found that various features on the skin of a patient can be brought into greater clarity by adjusting the offsets of the embossed image. A user may therefore focus on the desired feature that they wish to show a patient. When the desired offsets are selected, the user may freeze the offsets by tipping the pen on the tablet. A user may then adjust the scale parameter by floating the pen parallel to the x-axis of the tablet. Again, it has been found that various skin features can be brought into greater clarity by adjusting the pressure of the emboss. When the desired pressure results are achieved, the user may freeze the image by tipping the pen on the tablet.

While the preferred embodiment of the invention has been illustrated and described, it will be appreciated that various changes can be made therein without departing from the spirit and scope of the invention. For example, the advantages of the aesthetic imaging system are not limited to imaging for cosmetic surgery only, but are applicable to a number of medical imaging fields, including endoscopy, pathology, and hair restoration. Those skilled in the art will recognize adaptations that may be made to accommodate these medical imaging fields without departing from the scope of the invention. Also, a different style of pointing device may be used in lieu of the pen and tablet.

The embodiments of the invention in which an exclusive property or privilege is claimed are defined as follows:

1. A user interface for an aesthetic imaging system containing digitized images of a patient, the aesthetic imaging system allowing a user to manipulate a patient image to display potential results achievable through cosmetic surgery, the aesthetic imaging system including a processor, a memory, a monitor, and means for controlling a cursor displayed on the monitor, the user interface comprising:

(a) a display area for displaying a digital image of a patient comprised of a plurality of color pixels; and (b) a command menu area for displaying a plurality of commands that may be used to manipulate the digital image of the patient, the command menu area substantially overlapping the display area so that a portion of the digital image is positioned behind the command menu area, the command menu area being substantially transparent to allow the portion of the digital image positioned behind the command menu area to be visually apparent to a user, the plurality of commands in the command menu being substantially opaque and visually distinguishable from the portion of the digital image positioned behind the command menu area to allow the user to select from the plurality of commands.

2. The user interface of claim 1, wherein the display area encompasses the entire screen of the monitor.

3. The user interface of claim 2, wherein the plurality of commands in the command menu area are removed during editing of the digital image.

4. The user interface of claim 1, wherein the command menu area may be moved by the user to a desired location on the display area to minimize the overlap of the command menu area with the display area.

* * * * *